US008942934B2

(12) United States Patent
Kitagawa et al.

(10) Patent No.: US 8,942,934 B2
(45) Date of Patent: Jan. 27, 2015

(54) ENERGY MONITORING DEVICE AND CONTROL METHOD THEREFOR, AND ENERGY MONITORING PROGRAM

(75) Inventors: Shintaro Kitagawa, Kanagawa (JP); Taisuke Tateishi, Nara (JP); Kenji Yamamura, Kyoto (JP); Hiroshi Saito, Shiga (JP); Maki Endo, Kyoto (JP); Chisato Nakashima, Nara (JP)

(73) Assignee: Omron Corporatin, Kyoto (JP)

( * ) Notice: Subject to any disclaimer, the term of this patent is extended or adjusted under 35 U.S.C. 154(b) by 589 days.

(21) Appl. No.: 13/248,484

(22) Filed: Sep. 29, 2011

(65) Prior Publication Data

US 2012/0084030 A1     Apr. 5, 2012

Related U.S. Application Data

(63) Continuation of application No. PCT/JP2010/001401, filed on Mar. 2, 2010.

(30) Foreign Application Priority Data

Apr. 10, 2009    (JP) ................................ 2009-096319

(51) Int. Cl.
*G01R 21/00*     (2006.01)
*G05B 15/02*     (2006.01)
*G05B 23/02*     (2006.01)

(52) U.S. Cl.
CPC ............ *G05B 15/02* (2013.01); *G05B 23/0283* (2013.01)
USPC ........................................................ 702/61

(58) Field of Classification Search
USPC ........................................................ 702/61
See application file for complete search history.

(56) References Cited

U.S. PATENT DOCUMENTS 7,076,405 B1 *   7/2006   Uchino .............................. 703/2
8,255,090 B2 *   8/2012   Frader-Thompson
                            et al. ............................. 700/295

(Continued)

FOREIGN PATENT DOCUMENTS

JP          4-36634          2/1992
JP      2002-189511          7/2002

(Continued)

OTHER PUBLICATIONS

International Search Report for corresponding International Application No. PCT/JP2010/001401, along with an English language version, dated May 18, 2010.

(Continued)

*Primary Examiner* — Sujoy Kundu
*Assistant Examiner* — Alvaro Fortich
(74) *Attorney, Agent, or Firm* — Greenblum & Bernstein, P.L.C.

(57) ABSTRACT

A processing machine processes a work and repeats processes on the work, thereby consuming energy. Within the consumed energy, room for improvement is computed by an energy monitoring device and is referred to as an amount of energy that can be improved. An energy monitoring device includes a power data acquirer that acquires a time-series power data measured by a power meter, a cycle detector that detects a single-cycle power data from the power data acquired by the acquirer, a divider that divides the single-cycle power data detected by the detector into an added-value creating portion and an unproductive portion, and a computing unit that computes an amount of energy consumed in the unproductive portion divided by the divider and defines it as the amount of energy to be improved.

21 Claims, 21 Drawing Sheets

(56) References Cited

U.S. PATENT DOCUMENTS

| | | | |
|---|---|---|---|
| 8,265,776 B2* | 9/2012 | Osann, Jr. ..................... 700/22 |
| 2002/0024002 A1* | 2/2002 | Otani et al. ............... 250/214 R |
| 2003/0061004 A1* | 3/2003 | Discenzo .................... 702/182 |
| 2003/0061091 A1* | 3/2003 | Amaratunga et al. .......... 705/10 |
| 2003/0163714 A1* | 8/2003 | Nortung ...................... 713/189 |
| 2004/0119608 A1* | 6/2004 | Rao et al. ................ 340/870.01 |
| 2005/0222784 A1* | 10/2005 | Tuff et al. ...................... 702/61 |
| 2005/0258154 A1* | 11/2005 | Blankenship et al. .... 219/130.01 |
| 2006/0007016 A1* | 1/2006 | Borkowski et al. ...... 340/870.02 |
| 2007/0038394 A1* | 2/2007 | Gagnon et al. ................. 702/61 |
| 2007/0094043 A1* | 4/2007 | Bannai et al. .................... 705/1 |
| 2007/0276547 A1* | 11/2007 | Miller .......................... 700/295 |
| 2009/0043441 A1* | 2/2009 | Breed ............................ 701/29 |
| 2009/0204267 A1* | 8/2009 | Sustaeta et al. ............... 700/291 |
| 2010/0010688 A1* | 1/2010 | Hunter ......................... 700/300 |
| 2010/0090862 A1* | 4/2010 | Dubrow et al. .......... 340/870.01 |

FOREIGN PATENT DOCUMENTS

| | | | |
|---|---|---|---|
| JP | 2002-243776 | | 8/2002 |
| JP | 2002-304207 | | 10/2002 |
| JP | 2004-070424 | | 3/2004 |
| JP | 2005-22052 | | 1/2005 |
| JP | 2006-011897 | | 1/2006 |
| JP | 2007-148726 | | 6/2007 |
| JP | 2008-097128 | * | 4/2008 |

OTHER PUBLICATIONS

International Preliminary Report on Patentability for corresponding International Application No. PCT/JP2010/001401, along with an English language translation, dated Oct. 11, 2011.

U.S. Appl. No. 13/248,515, to Kenji Yamamura et al., filed Sep. 29, 2011.

U.S. Appl. No. 13/248,493, to Hiroshi Saito et al., filed Sep. 29, 2011.

U.S. Appl. No. 13/248,506, to Hiroshi Saito et al., filed Sep. 29, 2011.

* cited by examiner

Examples of machine tool

Examples of press machine

Fig. 12
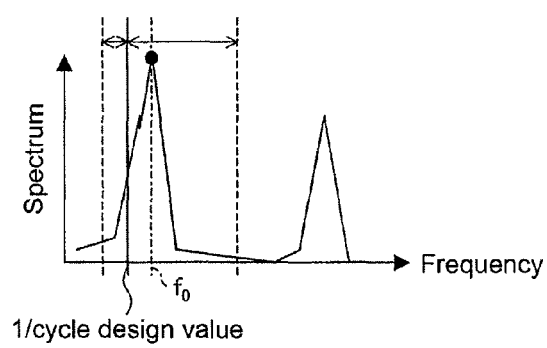
1/cycle design value
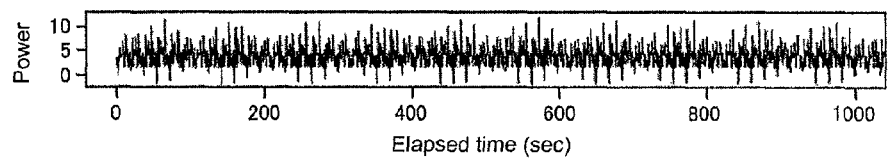
Fig. 13 (a)
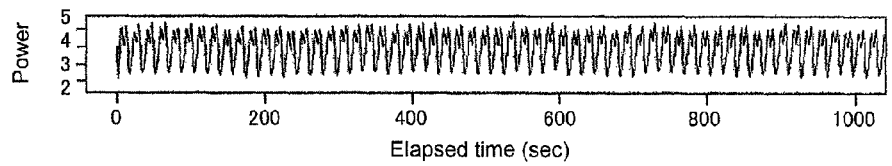
Fig. 13 (b)
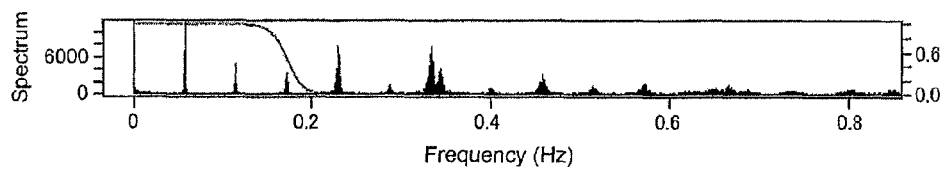
Fig. 14 (a)
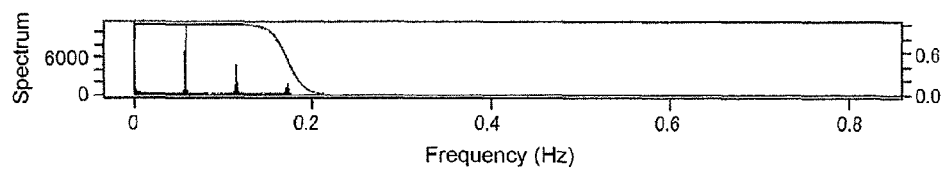
Fig. 14 (b)

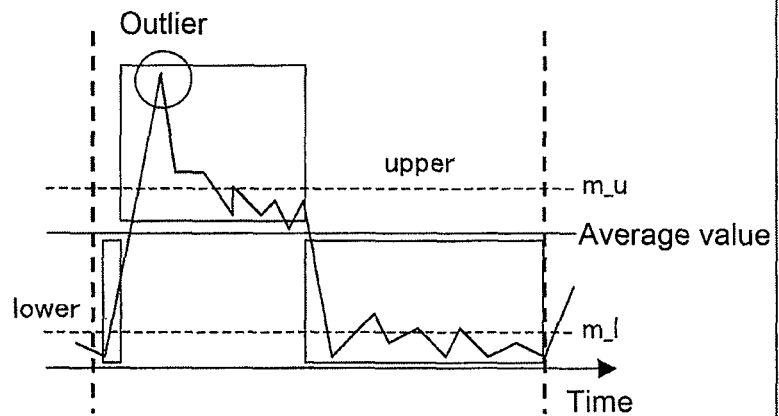
Fig. 24 (a)
Fig. 24 (b)
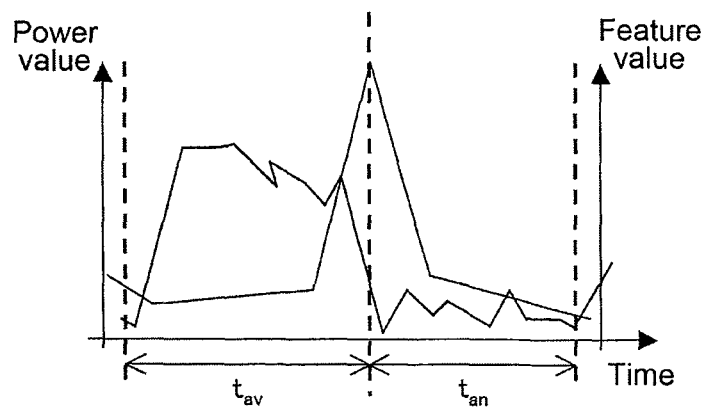
Fig. 25

US 8,942,934 B2

ENERGY MONITORING DEVICE AND CONTROL METHOD THEREFOR, AND ENERGY MONITORING PROGRAM

CROSS-REFERENCE TO RELATED APPLICATIONS

This is a continuation application of PCT/JP/2010/001401 filed Mar. 2, 2010, designating the United States of America, the disclosure of which, including the specification, drawings, and claims, is incorporated by reference in its entirety. The disclosure Japanese Patent Application No. 2009-096319 filed on Apr. 10, 2009, including the specification, drawings, and claims is expressly incorporated by reference in its entirety.

TECHNICAL FIELD

The present invention relates to an energy monitoring device, a method of controlling the energy monitoring device, and an energy monitoring program, in which the energy monitoring device computes an amount of energy to be improved within an energy consumed by a processing machine executing processes. Specifically, the present invention relates to an energy monitoring device and the like that computes an amount of energy that may be reduced, in which the processing machine processes a manufacturing object and repeats the processes on the manufacturing object.

BACKGROUND TECHNOLOGY

In recent years, in the industrial world, reduction of consumed energy (hereafter, energy reduction) of various devices used in manufacturing is desired to reduce a manufacturing cost. Further, a nation-level energy reduction is encouraged as a countermeasure to the global warming. Therefore, various techniques that contribute to energy reduction are suggested.

For example, a control device described in a related art 1 easily and accurately controls an operation status of a plurality of manufacturing equipment installed in the factory. In the related art 1, an operation status includes a manufacturing state, a preparation (stand by) state, and a stop state. By controlling and analyzing the time-series operation status of manufacturing equipment, it is possible to detect whether each one of the manufacturing equipment consumes a surplus energy. In addition, information such as the time-series operation status, the time-series electric energy power consumption and the like of the manufacturing equipment can be used to consider the progress in production efficiency, replacement of manufacturing equipment, and the like. For example, an electric power monitoring device for machining described in related art 2 decides a timing of replacement based on a rise in the electric power due to degradation and abrasion of the processing machine.

Moreover, machine tool operation information collecting system described in a related art 3 measures the operation signal that specifies the operation status of the machine tool in real-time. Characteristics of the operation signal for each category related to the operation status are pre-configured as a criterion per machine tool. The operation status of the operation signal for each category is determined by comparing to the criterion, based on the measured characteristic of the signal for each category of the operation status that corresponds to a target machine tool model for measurement. The results of determination are stored as operating information per each category.

Accordingly, the operation status per category is automatically understood. Examples of category listed in the related art 3 includes electric power supply to NC machine tool; operation of NC machine tool; processing status; retooling; and rotation of main shaft; and these are detected by each sensor.

RELATED ART

Related Art 1: Japanese Patent Laid-open Publication No. 2008-097128 (Published on Apr. 24, 2008).
Related Art 2: Japanese Patent Laid-open Publication No. 2006-011897 (Published on Jan. 12, 2006).
Related Art 3: Japanese Patent Laid-open Publication No. 2004-070424 (Published on Mar. 4, 2004).

SUMMARY OF INVENTION

Shortcomings to be Solved by the Invention

In general, a waste generated while equipment is in operation largely divides into an arrest-type waste and an operating-type waste. Examples of the arrest-type waste include: equipment malfunction; retooling; replacement of jig; cutting tool, and/or the like; and launching or shutting down of the equipment.

On the other hand, an unproductive period where no added-value is created in an operating cycle time while the equipment is processing a work (target of production) falls under the operating-type waste. Generally, time required to mount and dismount a work, time for approaching and withdrawing tool, idling time, and the like fall under this.

Here, in a process that repeats jobs and tasks, a cycle time refers to a time required for one job or one task to complete. It also refers to a unit of cycle and frequency of the process. FIG. 10 is a graph that shows one example of change in electric power consumption of the processing machine over time. The graph shows the cycle time described above. For example, in a machine tool, a single cycle time is a time from a start of processing on a work until completion of the processing, as shown in FIG. 10 (a).

In a press machine, processing time spent on processing a single work is very short (i.e. 0.5 ms, and the like). However, as shown in FIG. 10 (b), when a press operation is repeatedly performed on a predetermined number of products and then stands-by for predetermined duration, this series of process can be regarded as repeating. Accordingly, from a start of a press operation till the end of the stand-by can be considered as a single-cycle.

The related art 1 to 3 above are limited to evaluating a portion of the above arrest-type waste, and they have not reached as far as evaluating the above operating-type waste.

To evaluate the operating-type waste, installing a sensor to detect a presence of the added-value creation is considered. However, the presence of added-value creation differs from machine to machine, and as types of processing machines installed in the manufacturing line increases, various types of sensors are needed, hence increasing the cost and requiring more complex processes.

The presence of added-value creation may be acquired by obtaining the operating status of the processing machine from a PLC (Programmable Logic Controller) which controls the processing machine. However, a new PLC is required when no PLC is equipped. Even when a PLC is equipped, a PLC ladder program needs to be changed. Thus, the cost increases and more complex processes are required.

To address the circumstances above, an object of the present invention is to provide an energy monitoring device that can easily evaluate the operating-type waste.

In order to resolve the above shortcomings, an energy monitoring device of the present invention computes an amount of energy to be improved within an energy consumed by a machine executing a process. The energy monitoring device includes a power data acquirer that acquires time-series physical quantity data related to the consumed energy; a cycle detector that detects time-series data of predetermined duration in the time-series data acquired by the power data acquirer; a divider that divides the time-series data detected by the cycle detector; and a computing unit (e.g., computer) that computes an amount of energy consumed in a non-added-value portion as the amount of energy to be improved, the non-added-value portion being not producing any added-value in the process, and obtained from a portion divided by the divider.

In order to resolve the above shortcomings, a method that controls an energy monitoring device of the present invention computes an amount of energy to be improved within an energy consumed by machine executing a process. The method includes an acquiring step to acquire time-series physical quantity data related to the consumed energy; a detecting step to detect time-series data of predetermined duration from the time-series data acquired in the acquiring step; a dividing step to divide the time-series data detected in the detecting step; and a computing step to compute an amount of energy consumed in a non-added-value portion as the amount of energy to be improved, the non-added-value portion being not producing any added-value in the process and obtained from a portion divided in the dividing step.

Here, time-series data detected by the detecting cycle detector may include, for example, single-cycle time-series data from a start to an end of the process, a plurality of single-cycle time-series data, and time-series data having predetermined duration, and the like.

In addition, the physical quantity related to the consumed energy may include, for example, electric power and electric current when the consumed energy is electric energy, and flow volume of the combustible fluid when the consumed energy is heat generated by burning combustible fluid, such as gas, petroleum, and the like. Further, the electric power may be acquired by time differential power or may be acquired as instantaneous power.

In general, operations executed in a process by a machine are predefined in advance. Accordingly, in the above predetermined duration, a portion that creates an added-value by the process and the rest are predefined beforehand.

Therefore, according to the configuration and method above, by detecting the time-series data of predetermined duration within the physical quantity time-series data related to the consumed energy, the detected time-series data can be divided in view of the added-value creation. Then, an amount of energy consumed in a no-added-value creating portion can be computed from a divided portion as an amount of energy to be improved. In other words, the operating-type waste can be evaluated as the amount of energy to be improved.

A measured value used to compute the amount of energy to be improved is limited to the physical quantity time-series data related to the consumed energy. Accordingly, measuring device installed in the machine may be limited to one. Further, there is no need to use a machine specific measuring device, for example, a wattmeter, an ammeter, a flow volume meter, and the like, to measure the physical quantity. Thus, the amount of energy to be improved can be easily computed.

As for the division above, dividing into two-parts may be performed based on whether or not the added-value is created. In addition, dividing into three-parts or more may be performed based on reliable creation, slight creation, unknown, and almost no creation. Further, it is possible to perform the division by duration, by a threshold value of the physical quantity, and by a frequency of the time-series data. Moreover, it is also possible to perform the division by a ratio of a physical quantity. For example, 30% of the physical quantity may be considered to be creating the added value and the remaining 70% to be unproductive. The ratio may be changed over time.

A method to detect single-cycle time-series data from the time-series data may include frequency analysis, template matching, and other known methods. Further, an accumulation of the computed amount of energy to be improved may be additionally computed.

In detail, the energy monitoring device of the present invention includes a memory that pre-stores waveform model information indicating a waveform model of the single-cycle time-series data and dividing conditions to divide the single-cycle time-series data by the divider. It is desirable to perform the division by the divider based on the dividing conditions stored in the memory when the cycle detector detects single-cycle time-series data that is compatible with the waveform model information stored in the memory.

In a case where the machine is capable of executing a plurality of different processes, a waveform of the single-cycle time-series data often differs in types of the production object. Thus, when a waveform is different, it is possible that the dividing condition is also different.

Thus, a plurality of dividing conditions are associated with a plurality of waveform model information and stored in the memory. Therefore, it is desirable to perform the division based on the dividing condition associated with the waveform model information that corresponds to the single-cycle time-series data detected by the cycle detector. In this case, it is possible to accommodate a machine that is capable of executing a plurality of different processes. Further, depending on which waveform model information is compatible with which time-series data, the type of production object undergoing the process can be determined.

In the energy monitoring device of the present invention, it is further desirable to equip a waveform model generator (creator) to generate the above waveform model information using the physical quantity time-series data acquired by the power data acquirer.

For example, a detected data acquirer in the energy monitoring device further acquires detected data from a sensor to detect a single-cycle of a machine. The energy monitoring device may further includes an input unit that receives instructions from a user, a cycle extractor to extract single-cycle time-series data from the time-series data acquired by the power data acquirer using the detected data acquired by the detected data acquirer; a waveform model generator that generates the waveform model information based on the single-cycle time-series data extracted by the cycle extractor; and a dividing condition setter that defines the dividing condition for the single-cycle time-series data extracted by the cycle extractor based on the instructions entered by the user via the input unit.

In this case, waveform model information is automatically generated, and the user can select the dividing condition by referring to the waveform of single-cycle time-series data based on the generated waveform model information.

The energy monitoring device of the present invention further includes a memory that pre-stores a design cycle-time value that is a design value for a period from a start to an end of the process by a machine. It is desirable that the cycle detector further includes a cycle start cycle detector to detect a start-point of the single-cycle time-series data based on the design cycle-time value.

For example, the energy monitoring device of the present invention further includes a memory that pre-stores a design cycle-time value that is a design value for a period from a start to an end of the process by the machine. The cycle detector may include a frequency analyzer that detects the design cycle-time value and a fundamental frequency that has the greatest spectrum on and around the design cycle-time value by analyzing the frequency of the acquired time-series data detected by the detected data acquirer; a filtering processor that executes filtering process on the time-series data to emphasize a frequency component on and around the fundamental frequency detected by the fundamental frequency analyzer; and a cycle start detector that detects a start-point of the single-cycle time-series data based on the time-series data filtered by the filtering processor.

In this case, a frequency component of a single-cycle that is equal to or close to the fundamental frequency is emphasized by the filtering process, hence, it become easy to detect single-cycle time-series data.

Meanwhile, the above cycle start cycle detector may detect a start-point of the single-cycle time-series by detecting a rise point of the post-filtering time-series data based on the post-filtering time-series data and its second order differential data.

Moreover, a memory that stores waveform pattern information indicating waveform pattern of the single-cycle time-series data is further included. The cycle start detector may detect a start-point of the single-cycle time-series data by detecting the single-cycle time-series data that matches the waveform pattern information stored in the memory.

The energy monitoring device of the present invention may further include a memory that stores waveform pattern information indicating the waveform pattern of the single-cycle power data, and a waveform pattern generator that generates the waveform pattern using a plurality of single-cycle time-series data detected by the cycle detector, and stores the waveform pattern in the memory. In this case, there is no need to pre-store the waveform pattern information in the memory.

The divider of the energy monitoring device of the present invention may further include a feature value computing unit (computer) that computes a feature value to divide the single-cycle duration at a point in time based on the single-cycle time-series data detected by the cycle detector; and a transition time determiner that identifies a start-point of a non-added-value portion not producing an added-value in the process based on the feature value computed by the feature value computing unit. In this case, there is no need to pre-store the dividing conditions in the memory. An example of the feature value includes a value which is statistically most likely to divide the single-cycle time-series data at a point in time.

It is desirable that the computing unit of the energy monitoring device of the present invention further compute energy consumed in the added-value creating portion that is a portion divided by the divider and creating the added-value in the process. In this case, a ratio of the consumed energy in the added-value creating portion to the consumed energy in the single-cycle can be computed, hence, the energy efficiency of the machine can be understood.

In addition, each step in the energy monitoring device can be executed by the energy control program in the computer. Furthermore, an arbitrary computer can execute the energy monitoring program by storing the energy monitoring program in a computer readable memory medium. For example, a non-transitory computer readable storage medium having computer instructions stored thereon includes an energy monitoring program that operates an energy monitoring device to compute an amount of energy to be improved within an energy consumed by equipment executing a process. The program causing a computer to perform acquiring time-series physical quantity data related to the consumed energy, detecting time-series data of predetermined duration from the acquired time-series data, dividing the detected time-series data, and computing an amount of energy consumed in a non-added-value portion as the amount of energy to be improved, the non-added-value portion not producing any added-value in the process and obtained from a portion of the divided data.

Effect of the Invention

As described above, an energy monitoring device related to the present invention detects the time-series data of predetermined period using the time-series physical quantity data related to energy consumption as the measured data. The detected time-series data can be divided into a portion of added-value creation. The consumed energy corresponding to the unproductive portion in the divided portion is computed as an amount of energy that can be removed, hence a waste of operating-type can be effectively and simply evaluated.

BRIEF EXPLANATION OF DRAWINGS

[FIG. 12] A graph of a frequency spectrum used to explain a method to detect fundamental frequency.

[FIG. 13] A graph showing one example of power data before and after a filtering process is executed by a filtering process executor in the energy monitoring device.

[FIG. 14] A graph showing a frequency spectrum of the power data.

[FIG. 24] A graph showing an example of correction executed by an outlier corrector in the energy monitoring device.

[FIG. 25] A graph showing corrected single-cycle power data and a feature value.

EMBODIMENTS OF THE INVENTION

[First Embodiment]

An embodiment of the present invention is described referring to FIGS. 1-7. Prior to describing the present embodiment, a device status and an amount of energy to be improved computed by the present embodiment are explained referring to FIG. 2.

Figure 2:
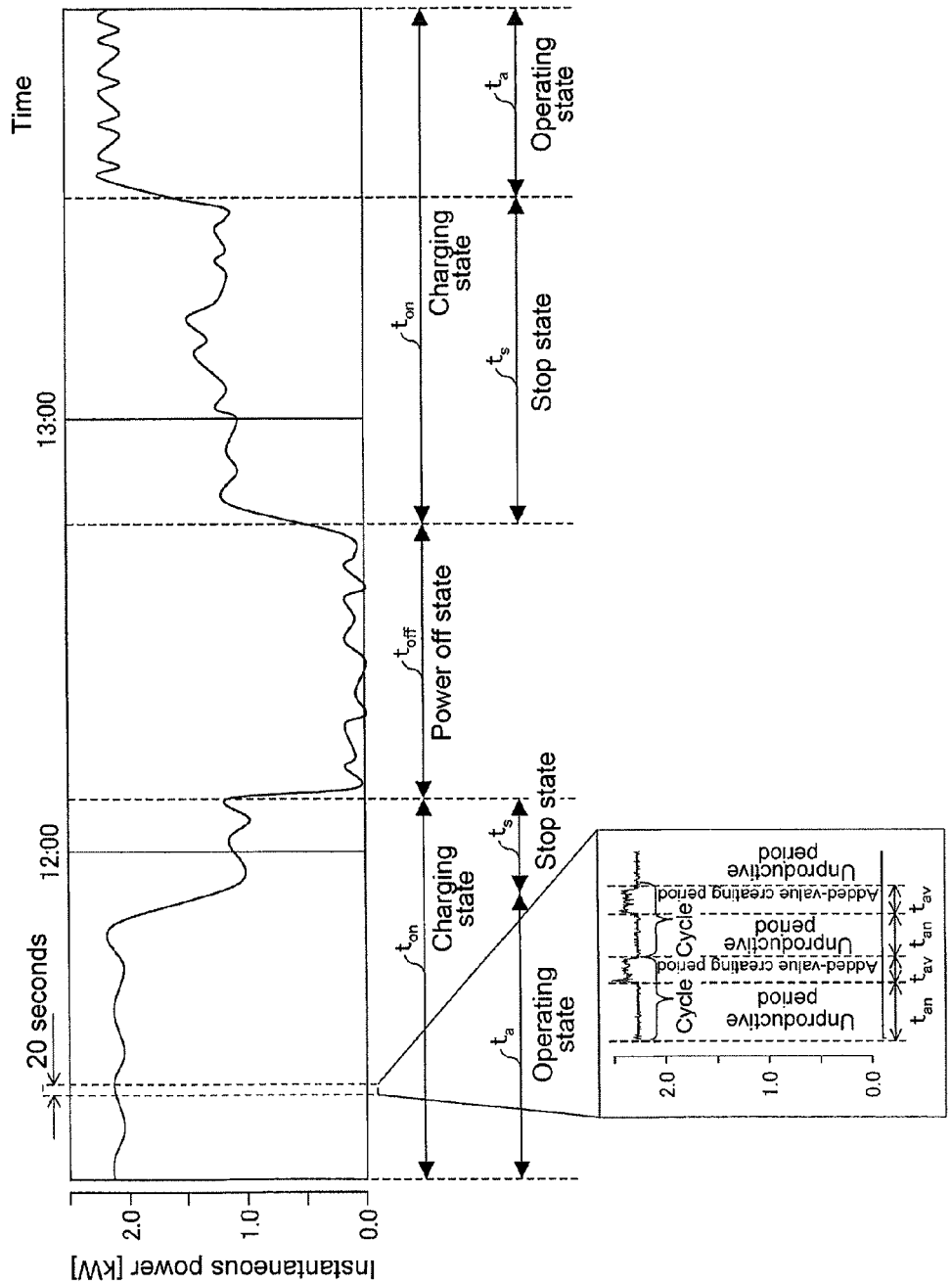
[FIG. 2] A graph showing an operating-status of a press machine.

FIG. 2 is a graph showing operating-status of a press machine, more specifically, a graph of varying instantaneous electric power (kW) over time that is consumed by the press machine. Top of FIG. 2 shows a graph that covers a couple of hours, in which one portion of the graph is magnified. In the bottom of FIG. 2, the magnified portion shows 20 seconds worth data. In FIG. 2, the press machine is used as an example, however, the device is not limited to the press machine and other devices may be used.

In the top of FIG. 2, a period $t_{off}$ having an instantaneous electric power close to 0 kW is a period when the press machine is turned off and is referred to as a power off state. On the other hand, a period $t_{on}$, which excludes the power off period $t_{off}$, is a period when the press machine is turned-on, and is referred to as a charging state.

While in the charging period $t_{on}$, a period $t_s$ having a lower instantaneous electric power corresponds to a period when the press machine is at rest, and is referred to as a stop state. The press machine is consuming the electric power even during the stop state. Therefore, an amount of electric power consumed in the period $t_s$ corresponds to the amount for improvement. A list of sources causing the stop state may include device malfunction; unexpected abnormality; retooling due to change of process arrangement (switching work, jig, and the like); exchange of expendable parts (cutting tool, and the like); and equipment start-up (warming up from the time it is turned on, and the like); shut-down (preparation before the power is turned off, and the like), and the like.

On the other hand, a period $t_a$ having a higher instantaneous electric power in the charging period $t_{on}$ corresponds to a period when the press machine is in operation, and is referred to as an operating-state. As indicated in the bottom of FIG. 2 which shows the operating-state, a period $t_{av}$ having a higher instantaneous electric power corresponds to a state when the press machine is actually pressing a work, and is referred to as an added-value creating period. This state is specifically called a net operating-state in the press machine. Meanwhile, a period $t_{an}$ having a lower instantaneous electric power corresponds to a period when the press machine is dealing with matters other than the pressing, for example, loading and unloading the works to/from the press machine, suspending conveyance due to the process delay in downstream machines, and the like. This period is referred to as an unproductive period. This period is referred to as an idling state specifically in a press machine.

Namely, the period $t_{av}$ is the net operating-state and is also the added-value creating period which creates the added-value by pressing. The period $t_{an}$ is the idling state and is also the unproductive period, in which no added-value is created. Accordingly, in the present embodiment, an amount of electric power consumed in the unproductive period $t_{an}$ is computed as the amount for improvement.

Figure 3:
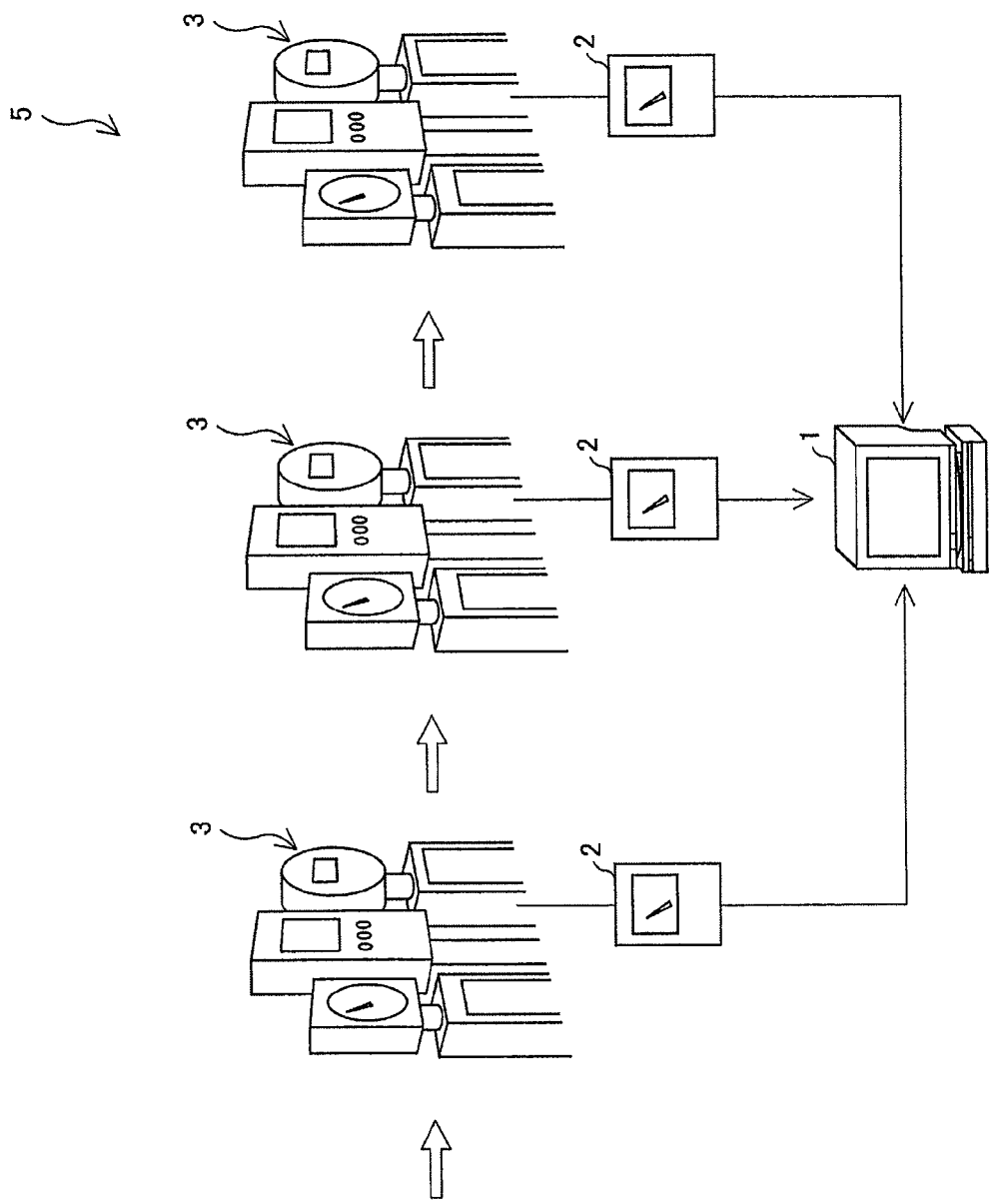
[FIG. 3] A diagram showing a schematic configuration of the energy monitoring system.

FIG. 3 shows schematic configuration of an energy monitoring system of the present embodiment. As shown in the figure, the energy monitoring system 5 includes a plurality of processing machines (devices) 3 arranged in a manufacturing line. The energy monitoring system also includes a plurality of power meters 2 that respectively measure power supplied to each one of the plurality of processing machines 3, and an energy monitoring device 1 electrically connected to the plurality of power meters 2.

For the processing machines 3, any machine, for example, a press machine, a mold injection machine, a cleaning machine and the like, can be used as long as operations executed in a single-cycle of process can be predefined beforehand. For the power meters 2, any meter, for example, a watt-hour meter, watt meter, and the like can be used as long as electric power per unit time, such as an instantaneous electric power or the like, can be measured.

The energy monitoring device 1 receives measured values read by each power meter 2, and computes the amount for improvement based on the receipt values for each processing machine 3. The amount for improvement corresponds to an operating-type waste of respective processing machine 3 generated while the processing machine 3 is in operation. The energy monitoring device 1 displays information related to the amount for improvement on a display 13 based on the computed amount for improvement. To simplify the description, the present embodiment narrows down to a single processing machine 3 and a single power meter 2, from this point forward. However, power meters 2 installed on other processing machines 3 can also compute the above described removable amount.

Figure 1:
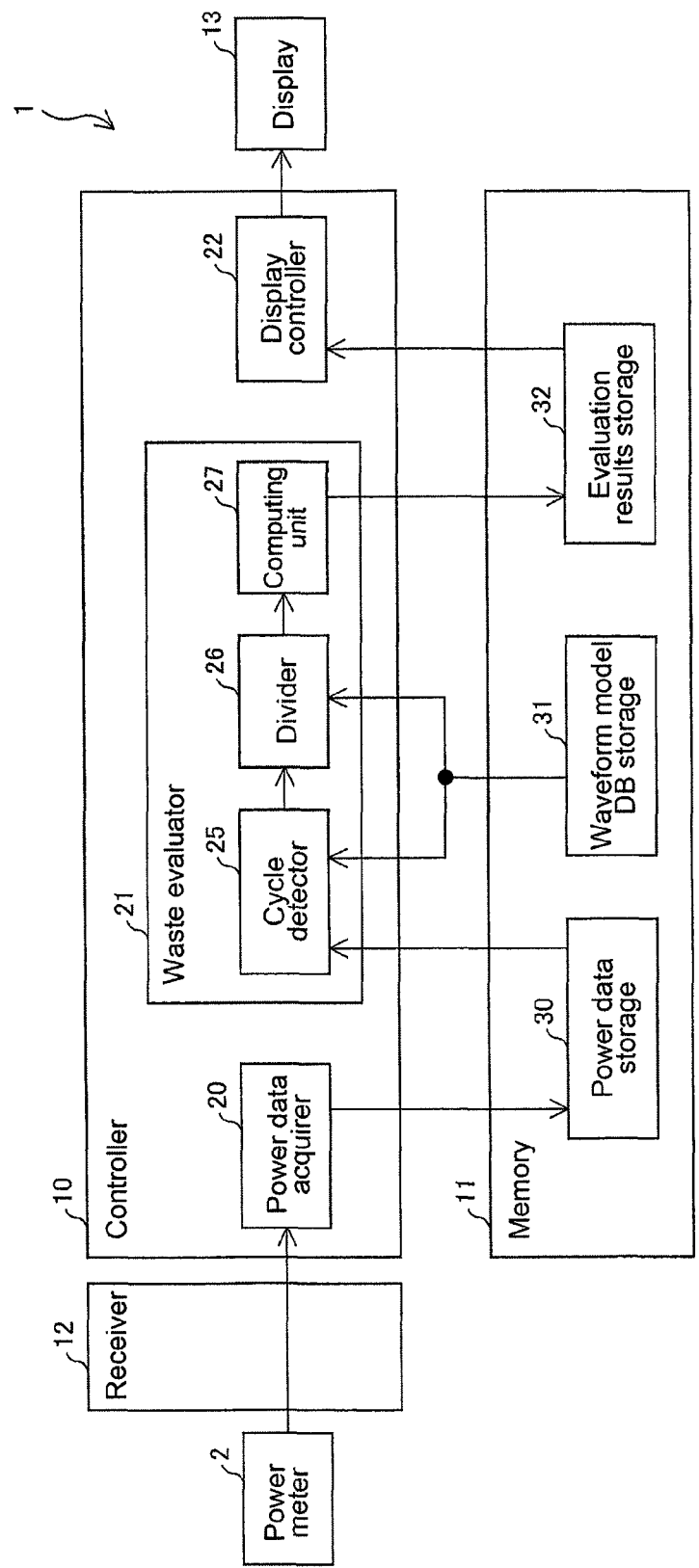
[FIG. 1] A block diagram showing a schematic configuration of an energy monitoring device in an energy monitoring system of an embodiment of the present invention.

FIG. 1 shows a schematic configuration of the energy monitoring device 1. As shown in FIG. 1, the energy monitoring device is configured to include a controller 10; a memory 11; a receiver 12; and a display 13.

The controller 10 is configured with a computer that includes, for example, CPU (Central Processing Unit) and a memory, where the controller 10 uniformly controls functions of each component of the energy monitoring device 1. Functions of each component are controlled by executing a control program by the computer. This control program may be executed in a format that reads a program stored, for example, in a removable media such as a flash memory and the like, or in a format that reads a program stored in a hard drive and the like. Further, the control program may be executed in a format that downloads a program, installs the downloaded program in a hard drive and the like, and reading the program therefrom. The detailed description of controller 10 will be provided later.

The memory 11 stores information and is configured with a non-volatile memory such as a flash memory, ROM (Read Only Memory) and the like and by a volatile memory such as a RAM (Random Access Memory) and the like. The detailed description of memory 11 will be provided later.

The receiver 12 receives a signal from outside and supplies the received signal to the controller 10. Specifically, the receiver 12 receives the measured data from the power meters 2. The receiver 12 may receive a signal via a cable or wirelessly.

The display 13 outputs all sorts of information on display. The display 13 is configured with a display device such as an LCD (Liquid Crystal Display), a CRT (Cathode-Ray Tube), a plasma display, and the like.

Next, the controller 10 and the memory 11 are described in detail. As shown in FIG. 1, the controller 10 is configured to include a power data acquirer 20; a waste evaluator 21; and a display controller 22. Further, the memory 11 is configured to include a power data storage 30; a waveform model DB (Data Base) storage 31; and an evaluation results storage 32.

The power data storage 30 stores power data, that is, a power value measured in time-series by the power meter 2. The power data includes a time stamp per power value or per predetermined period. Further, the evaluation results storage 32 stores the evaluation results obtained by the waste evaluator 21.

The waveform model DB storage 31 pre-stores a waveform model DB including waveform model information and a dividing condition which corresponds to the waveform model. The waveform information refers to a waveform model of single-cycle power data. The dividing condition refers to a condition to divide the single-cycle power data into an added-value creating portion and an unproductive portion. In the present embodiment, the dividing conditions included in the waveform model DB are the added-value creating period $t_{av}$ and the unproductive period $t_{an}$.

For example, the single-cycle can be regulated such that from the beginning of the cycle up to 5 sec is the unproductive period $t_{an}$, from 5 sec to 12 sec is the added-value period $t_{av}$, and from 12 sec onward is the unproductive period $t_{an}$. In addition, the single-cycle can be regulated such that from the beginning of the cycle up to "a" % of cycle period T is the unproductive period $t_{an}$, thereafter up to "b" % of a cycle period T is the value added period $t_{av}$, and the rest is the unproductive period $t_{an}$.

Figure 4:
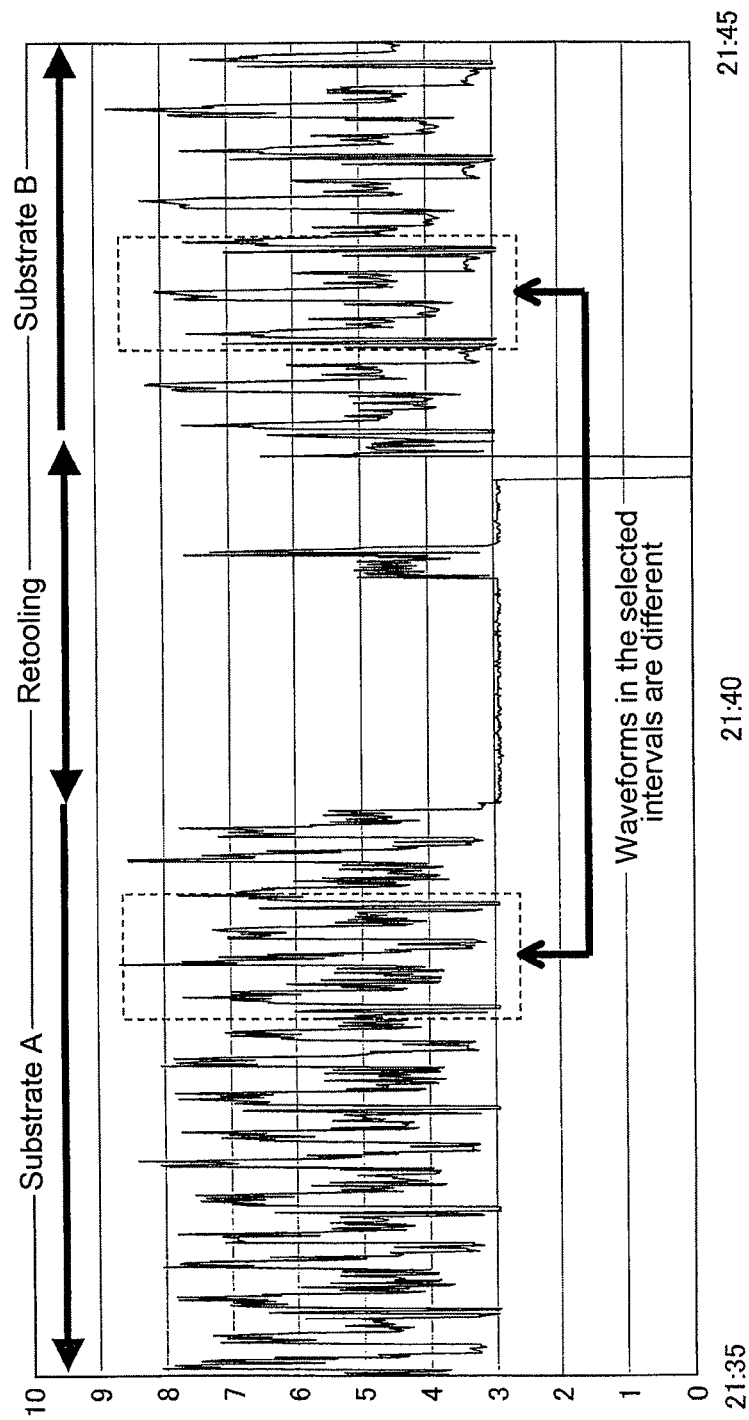
[FIG. 4] A graph showing an operating-state of a mounting device.

In addition, when the different types of works are processed, potential of having different waveforms for respective single-cycle power data is higher. FIG. 4 shows power data (charging state) of processing machine 3, which is a mounting machine that installs electronic components to a printing substrate. In the examples shown in FIG. 4, installation of electronic components to a type of substrate A is repeated. Upon retooling, installation of electronic components to a different type of substrate B is repeated. The area enclosed by the dashed line indicates the single-cycle power data. By referring to FIG. 4, one can understand the differences in the single-cycle power data waveforms based on the different types of substrate.

Accordingly, when the processing machine 3 can process a plurality of different types of works, it is preferable to store per respective work type; waveform model information, and the added-value creating period $t_{av}$ and the unproductive period $t_{an}$ that corresponds to the respective waveform model. On the other hand, when the processing machine 3 processes only one type of work, waveform model information, the added-value creating period $t_{av}$, and the unproductive period $t_{an}$ may be fixed.

Further, the waveform model information may be single-cycle power data itself, and/or a waveform feature data that points out waveform features of the respective power data. In addition, the waveform model information may be decided automatically as described in an embodiment below, and/or decided by an expert by referring to actual single-cycle power data.

The expert refers to a specific behavior in the single-cycle of the processing machine 3 to decide the added-value creating period $t_{av}$ and the unproductive period $t_{an}$. When either one of the added-value creating period $t_{av}$ and the unproductive period $t_{an}$ is stored, the remaining other period is a corresponding left over period, hence it can be easily computed from the stored period.

The power data acquirer 20 acquires power data from the power meter 2 via the receiver 12. The power data acquirer 20 stores the acquired power data in the power data storage 30. In the present embodiment, the power data from the power meter 2 is time-series data of the instantaneous electric power. However, the power data may be time-series data of averaged electric power from a sampling period.

The waste evaluator 21 evaluates the waste of the operating-type. The waste evaluator 21 is configured to include a cycle detector 25; a divider 26; and an computing unit 27.

The cycle detector 25 detects a portion of single-cycle from the power data read from the power data storage 30. The cycle detector 25 sends the detected single-cycle power data to the divider 26.

Normally, single-cycle power data includes various characteristics. Thus, by detecting the respective characteristic, the single-cycle power data can be detected. For example, when a distinctive frequency is included, frequency analysis can detect the single-cycle power data. When a distinctive waveform is included, matching a pattern by way of template matching or the like can detect the single-cycle power data. When a distinctive electric energy consumption is included, having an accumulated electric energy reaching a predetermined value can detect the single-cycle power data. Further, when a characteristic of having a repeated generation is included, statistics can detect the single-cycle power data. To detect a single-cycle power data, any of these method or combination of some of these methods may be used.

Figure 5:
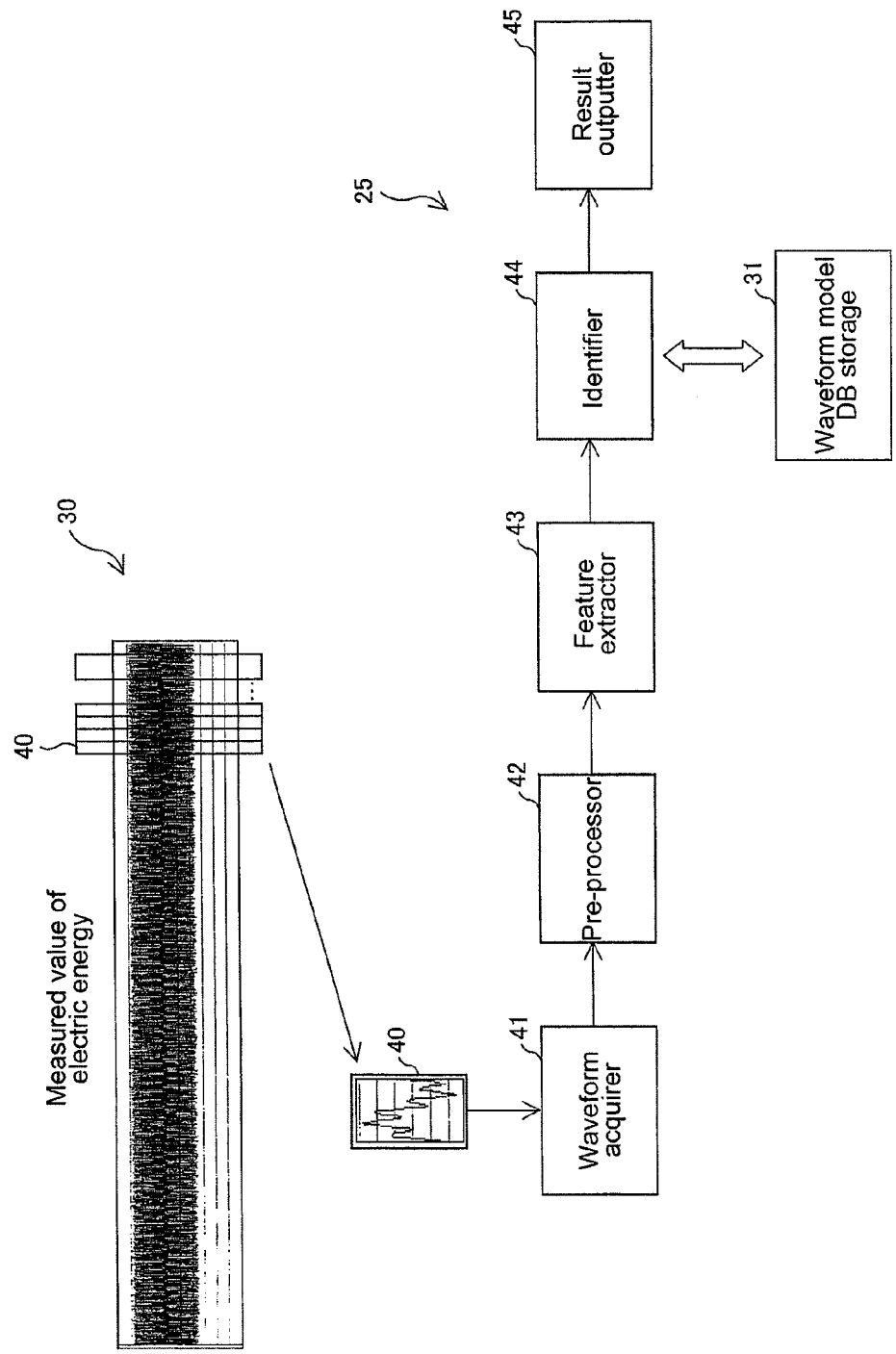
[FIG. 5] A block diagram showing a schematic configuration of a cycle detector in the energy monitoring device.

FIG. 5 shows a schematic configuration of the cycle detector 25 when detecting the single-cycle power data by way of the pattern matching. When using the pattern matching, even a waveform that extends in the time axis can be recognized. As shown in the figure, the cycle detector 25 is configured to include a waveform acquirer 41; a pre-processor 42; a feature extractor 43; a identifier 44; and a result outputter 45.

The waveform acquirer 41 acquires power data having predetermined duration within the power data stored in the power data storage 30. The waveform acquirer 41 sends the acquired data to the pre-processor 42.

The pre-processor 42 executes pre-processes such as a noise removal process and a normalizing process, and the like. The pre-processor 42 sends the post-process power data to the feature extractor 43.

The feature extractor 43 extracts a predetermined waveform feature data from the power data forwarded from the pre-processor 42. Examples of the predetermined waveform feature data include frequency, sharp rise, and the like. The feature extractor 43 sends the extracted waveform feature data to the identifier 44.

The identifier 44 identifies whether a portion that corresponds to single-cycle power data exists in the power data acquired by the waveform acquirer 41. The identifier 44 identifies by matching patterns of the waveform feature data forwarded from the feature extractor 43 and the waveform model information stored in the waveform DB storage 31. The identifier 44 sends the discrimination results to the result outputter 45. When several kinds of waveform model exist, the identifier 44 identifies which waveform model corresponds to the power data acquired from the waveform acquirer 41.

The results outputter 45 outputs the power data based on the discriminating results forwarded from the identifier 44. Specifically, when the portion that corresponds to the single-cycle data exists in the power data acquired by the waveform acquirer 41, the result outputter 45 outputs the respective portion of power data to the divider 26.

Referring to FIG. 1 again, the divider 26 divides the single-cycle power data detected by the cycle detector 25 into an added-value creating portion where an added-value is created and an unproductive portion where no added-value is created. Specifically, the cycle detector 25 reads the added-value creating period $t_{av}$ and the unproductive period $t_{an}$ from the waveform model DB storage 31, and divides the single-cycle power data into power data of the added-value period $t_{av}$ and power data of the unproductive period $t_{an}$. The divider 26 sends a plurality of divided power data to the computing unit 27.

The computing unit 27 determines total electric power (electric energy consumption) of the power data divided by the divider 26. In detail, the computing unit 27 determines the total power data generated in the added-value creating period $t_{av}$ whose data is forwarded from the divider 26. The computing unit 27 also determines the total power data generated in the unproductive period $t_{an}$, respectively, whose data is also forwarded from the divider 26. The unproductive period $t_{an}$ corresponds to the operating-type waste, therefore, the operating-type waste can be evaluated by the total electric power (electric energy consumption) computed from the unproductive period $t_{an}$ by the computing unit 27. Accordingly, the total electric power from the unproductive period $t_{an}$ becomes the amount for improvement which is an amount of energy that may be removed or reduced to improve the total energy consumption.

The computing unit 27 stores the power data of the added-value period $t_{av}$ and its total electric power in the results evaluation storage 32. The computing unit 27 also stores the power data of the unproductive period $t_{an}$ and its total electric power in the results evaluation storage 32. Thus, an amount for improvement and the like can be obtained, for example, in a case when the processing machine 3 is running for 1 hour, and in another case when the single lot of work is processed by the processing machine 3.

The display controller 22 controls to display information related to the room for improvement on the display 13 using the various information stored in the result evaluation storage 32.

Figure 6:
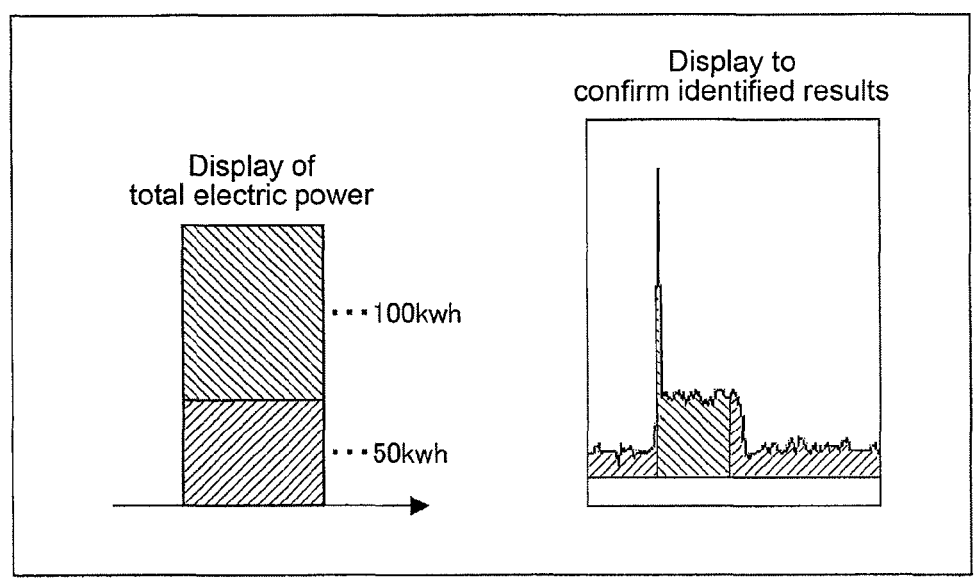
[FIG. 6] A graph showing display examples that appear on a display of the energy monitoring device.

FIG. 6 shows one example of graph displayed on the display 13. Right side of the figure includes a line chart showing the single-cycle power data detected by the cycle detector 25. Left side of the figure includes a bar chart showing the total electric power. In FIG. 6, an area having a right-downward oblique hatching indicates the power data of the added-value period $t_{av}$ and its total electric power. An area having a right-upward oblique hatching indicates the power data of the unproductive period $t_{an}$ and its total electric power. Accordingly, based on the images shown in FIG. 6, the operating-type waste and the amount for improvement for improvement can be understood.

Figure 7:
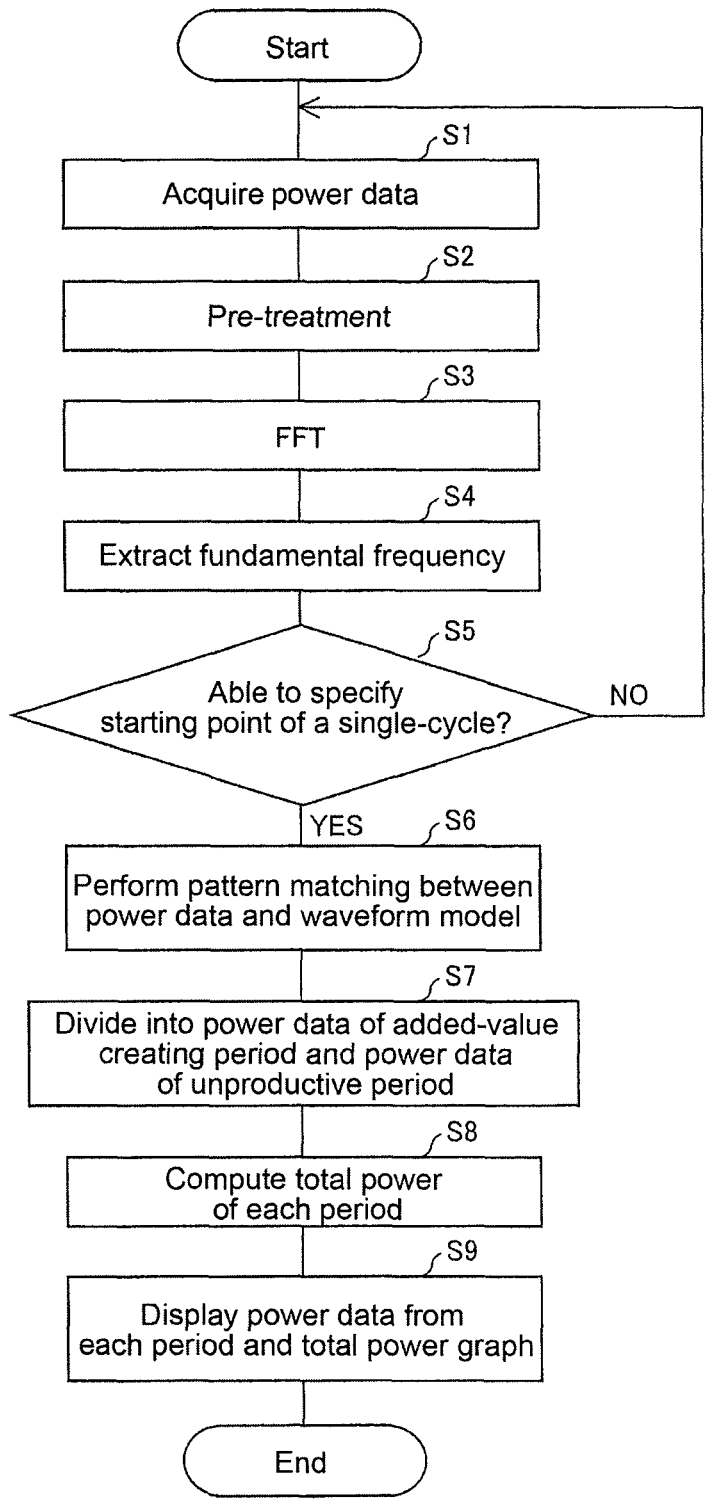
[FIG. 7] A flow chart diagram schematically showing processes executed by a controller in the energy monitoring device.

Next, processes of controller 10 of the above configured energy monitoring device 1 is described referring to FIG. 7. FIG. 7 schematically shows the processes executed by the waste evaluator 21 and the display controller 22 of the controller 10.

As shown in FIG. 7, the waveform acquirer 41 in the cycle detector 25 acquires the power data having predetermined duration from the power data storage 30 (Step 1, hereafter indicated by S1. Similar designation applies to all steps). The pre-processor 42 performs a pre-treatment process such as noise removal or the like (S2). Next, the feature extractor 43 executes an FFT (Fast Fourier Transform) on the post-processed power data (S3), and extracts the fundamental frequency of the cycle waveform (S4).

Next, the identifier 44 computes a time derivative of the power data. And, by a size of the computed derivative (sharpness of rise), the identifier 44 specifies a starting point of a single-cycle in the power data. When the identifier 44 is unable to specify the starting point ("No" at S5), the step routes back to S1 and repeats the processes due to lack of detecting the single-cycle power data.

On the other hand, when the starting point is specified (YES at S5), meaning that the single-cycle power data is detected, the divider 26 executes matching of pattern between the single-cycle power data and the waveform model information stored in the waveform model DB storage 31 (S6). Next, the divider 26 reads the added-value period $t_{av}$ and the unproductive period $t_{an}$ that corresponds to the above waveform information from the waveform model DB storage 31. Then, the divider 26 divides the single-cycle power data detected by the cycle detector 25 into the power data of the added-value period $t_{av}$ and the power data of the unproductive period $t_{an}$ (S7).

Next, the computing unit 27 computes total power of the power data of the added-value period $t_{av}$ and total power of the power data of the unproductive period $t_{an}$ (S8). Then, the display controller 22 controls the display 13 to show the graphs of the power data and the total powers of both of the added-value period $t_{av}$ and the unproductive period $t_{an}$ (S9). Thereafter, the processes are completed.

Accordingly, the energy monitoring device 1 of the present embodiment is able to compute the amount for improvement by detecting the single-cycle power data, dividing the detected single-cycle power data into the added-value creating portion and the unproductive portion, and defines the total power (electric energy consumption) of the unproductive portion as the improvement amount. That is, the operating-type waste is evaluated to be the amount for improvement. Further, to compute the improvement amount, nothing but a general-purpose power meter 2 is used as a measuring device. Therefore, the improvement amount is easily computed.

In addition, since the total power of the added-value creating portion is computed, a ratio of the total power, the added-value creating portion with respect to the single-cycle energy consumption, is understood, and energy efficiency of the processing machine 3 can be understood.

Further, one object of the present embodiment is to compute the total power of the unproductive period $t_{an}$, thus, computation for the added-value creating period $t_{av}$ may be omitted.

In the present embodiment, the divider 26 divides the single-cycle power data into two parts. However, the divider 26 may divide the single-cycle power data into three or more portions, for example, the added-value creating portion, the unproductive portion, and an undecided portion.

In addition, the divider 26 divides the single-cycle power data into the added-value creating portion and the unproductive portion by period, however, other dividing methods may be used. For example, a portion of power data less than 3 kW may be defined as the unproductive portion and a portion of power data above 3 kW may be defined as the added-value creating portion. Further, FFT may be used to divide, for example, a portion of power data having a frequency component less than 10 Hz as the unproductive portion, and the remainder is divided as the added-value creating portion. Accordingly, the power data may be divided by a threshold value or a frequency component.

Moreover, the divider 26 may divide the single-cycle power data by a ratio of electric power. For example, 30% of the electric power is set as the unproductive portion and a remaining 70% is set as the added-value creating portion. The above ratio may vary with time.

In the present embodiment, the identifier 44 computes the time derivative of the power data, then specifies the start-point of the single-cycle with the size of computed derivative. Instead, the single-cycle power data may be detected by matching the patterns between the waveform information stored in the waveform model DB storage 31 and the power data within the fundamental frequency range. In this case, even when the waveform of the power data extends in the time axis direction as compared to the waveform of the waveform information, the single-cycle power data can be detected.

[Second Embodiment]

Figure 8:
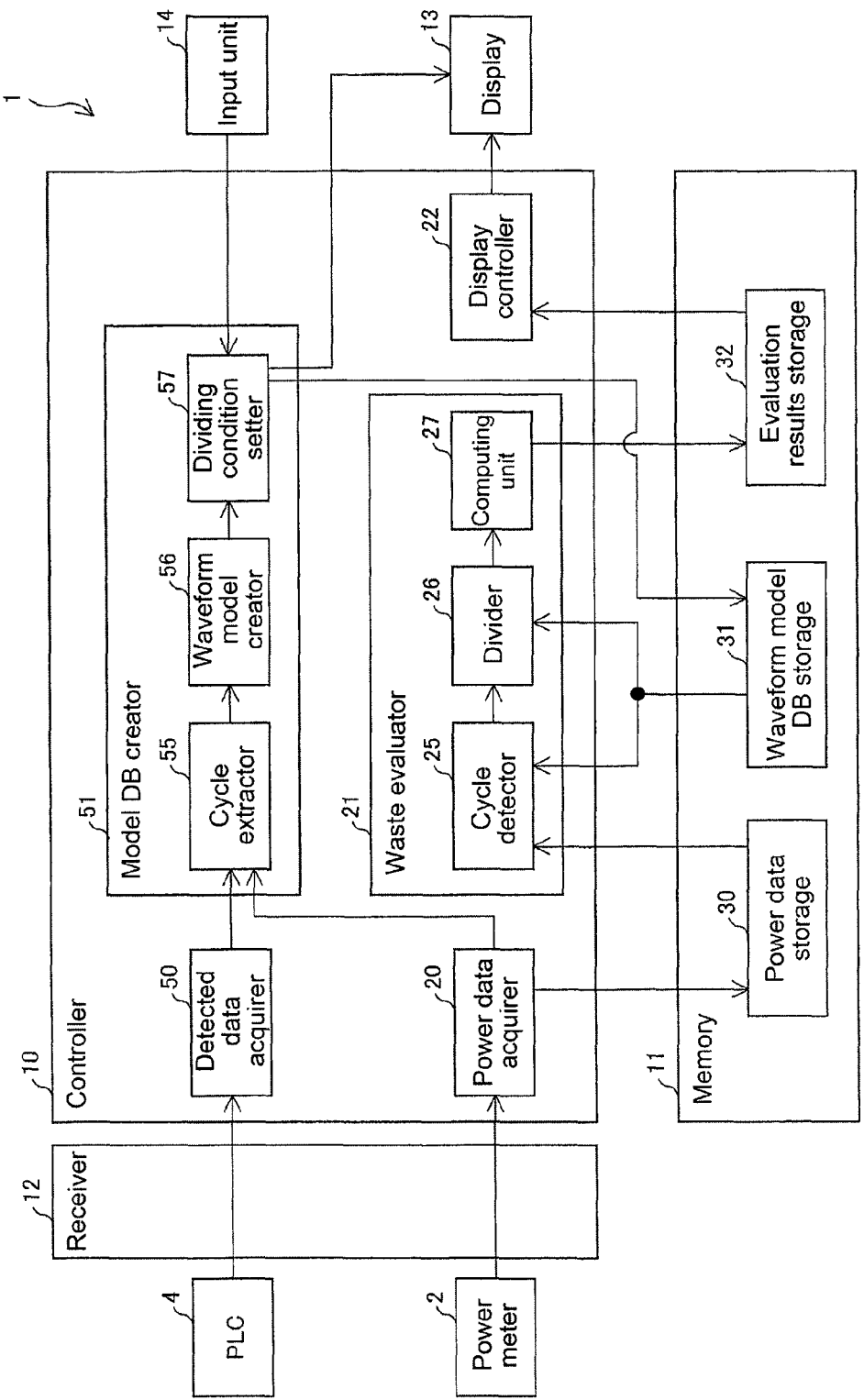
[FIG. 8] A block diagram showing a schematic configuration of an energy monitoring device in an energy monitoring system of another embodiment of the present invention.
Figure 9:
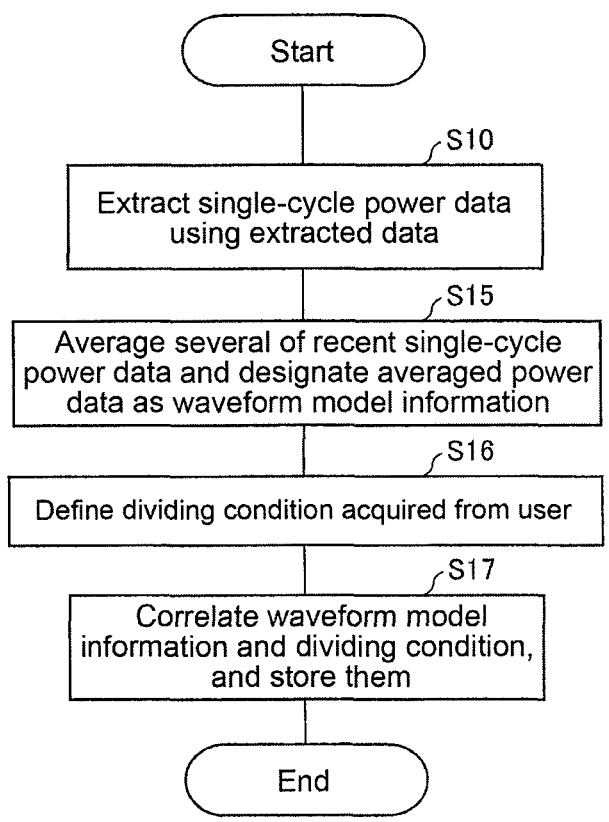
[FIG. 9] A flow chart diagram schematically showing processes executed by a controller in the energy monitoring device.
Figure 10:
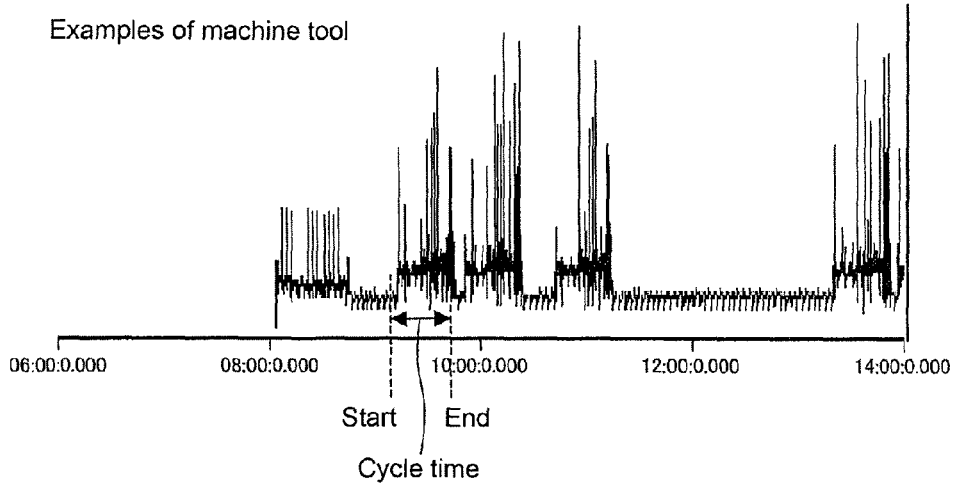
[FIG. 10] A graph showing one example of varying power consumed by a press machine over time.
Figure 10:
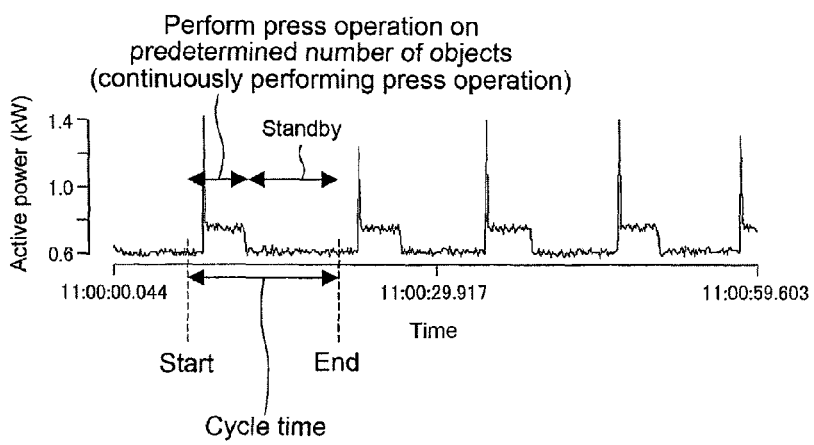

Next, another embodiment of the present invention is described referring to FIGS. 8 and 9. Compared to the energy monitoring system 5 shown in FIGS. 1~7, an energy monitoring system 5 of the present embodiment includes an additional component that creates a waveform model DB to be stored in the waveform model DB storage 31.

Compared to the energy monitoring system 5 shown in FIGS. 1~7, the energy monitoring system 5 of the present embodiment newly implements a PLC 4 to uniformly control the operations of the processing machine 3. An input unit 14 is newly added to an energy monitoring device 1, and a detected data acquirer 50 and a model DB creator 51 are newly installed in the controller 10 of the energy monitoring device 1. Components having the same functions described previously are labeled by the same numerical references and descriptions of these components are omitted.

In the processing machine 3, such as a press machine, a control device sends a single-cycle start operation signal and operation end signal to the processing machine 3 to control the operations of the processing machine 3. Thus, these signals are collected from the control device, the processing machine 3, or a signal cable connected between the control device and the processing machine 3 by a collecting device. Then, the collecting device sends the collected signals to the energy monitoring device 1. By this, the energy monitoring device 1 is able to recognize a period defined by the operation start signal and the operation end signal as the single-cycle in which the operation start and operation end signals are received by the collecting device.

As such, the PLC 4 in the present embodiment includes both the above described control function and the collecting function. The PLC 4 sends the operation start signal and the operation end signal to the processing machine 3 and the energy monitoring device 1. Besides the PLC 4, apparatus such as a motor, a heater, and the like in the processing machine 3 that operate in a repetitive single-cycle manner may use sensors to detect the single-cycle of the processing machine 3. This single-cycle of the processing machine 3 is detected from a change in physical quantity at these apparatus over time. Or, the single-cycle may be detected from the waveform information of the power data.

The input unit 14 receives user instructions and/or information, and configured with a key entering device (e.g., keyboard and button), or a pointing device (e.g., mouse).

The detected data acquirer 50 acquires the detected data from the PLC 4 through the receiver 12. The detected data acquirer 50 sends the acquired data to the model DB creator 51.

The model DB creator 51 creates the above discussed waveform model information and a corresponding added-value period $t_{av}$ and an unproductive period $t_{an}$. The model DB creator 51 uses the power data from the power data acquirer 20, the detected data from the detected data acquirer 50 and information entered by the user at input unit 14 to create the waveform model information and the corresponding added-value period $t_{av}$ and the unproductive period $t_{an}$. The model DB creator 51 is configured to include a cycle extractor 55; a waveform model creator 56; and a dividing condition setter 57.

The cycle extractor 55 receives detected data acquired by the detected data acquirer 50 and power data acquired by the power data acquirer 20. Then, the cycle extractor 55 extracts the single-cycle power data from the acquired power data based on the detected data. The cycle extractor 55 sends the extracted single-cycle power data to the waveform model creator 56.

The waveform model creator 56 uses the single-cycle power data sent from the cycle extractor 55 to create waveform model information of the single-cycle power data. The waveform model creator 56 sends the waveform model information created above to the dividing condition setter 57.

For example, the waveform model information may be obtained from a plurality of recent single-cycle power data. Specifically, a plurality of recent single-cycle power data is averaged to obtain the single-cycle power data and is used as the waveform model information. Further, a plurality of recent single-cycle power data is acquired, and then feature of each single-cycle power data is extracted by executing a similar function as in the feature extractor 43. A common feature among the extracted features from each of the plurality of single-cycle power data is designated as the waveform model information. Moreover, a plurality of waveform model information may be combined.

The dividing condition setter 57 defines the condition to divide the single-cycle power data into an added-value creating portion and an unproductive portion. The dividing condition setter 57 stores the defined dividing condition in the waveform model DB storage 31, where the defined dividing condition correlates to the waveform model information created by the waveform model creator 56.

The dividing condition setter 57 creates the waveform model based on the waveform model information from the waveform model creator 56. Specifically, the dividing condition setter 57 displays a waveform model of the single-cycle power data on the display 13. Next, a user decides the added-value portion and the unproductive portion of the single-cycle power data. The user decides the dividing condition by referring to the waveform model displayed on the display 13 and also considering the operation of the processing machine 3, thereby deciding the dividing condition. Then, the dividing condition setter 57 defines the dividing condition by acquiring the user decided dividing condition through the input unit 14.

Next, processes of the controller 10 in the above energy monitoring device 1 is described referring to FIG. 9. FIG. 9 schematically shows processes executed by the model DB creator 51 in the controller 10.

As shown in FIG. 9, the cycle extractor 55 receives detected data acquired by the detected data acquirer 50 and power data acquired by the power data acquirer 20. The cycle extractor 55 extracts a single-cycle power data from the acquired power data based on the detected data (S10). Next, the waveform model creator 56 averages several of recent single-cycle power data and designates the averaged single-cycle power data as the waveform model information (S15).

Next, the dividing condition setter 57 creates a waveform model of single-cycle power data and displays the waveform model on display 13. This waveform model is created based on the waveform model information created by the waveform model creator 56. Then, the condition setting unit 57 defines the dividing condition acquired from a user through input unit 14 (S16). The dividing condition setter 57 correlates the defined dividing condition to the waveform model information created by the waveform model creator 56, and stores the defined dividing condition in the waveform model DB storage 31 (S17). Thereafter, completes the process.

Accordingly, in the energy monitoring device 1 of the present embodiment, the waveform model information is automatically created. The user can decide the dividing condition by referring to the waveform model of the single-cycle power data created based on the waveform model information.

In the present embodiment, the detected data acquirer 50 and the model DB creator 51 are installed in the energy monitoring device 1, however, they may be installed in other devices. In that case, such devices send the waveform model information and dividing condition to the energy monitoring device 1.

Further, in the present embodiment, the single-cycle power data is extracted using the detected data from the PLC 4 and the power data from the power meter 2. However, extraction of single-cycle power data using the power data from the power meter 2 alone is also possible. In this case, there is no need to install a PLC 4 and a detected data acquirer 50.

That is, the cycle extractor 55 executes S1~S4 shown in FIG. 3 instead of S10. The waveform model creator 56 computes time derivatives of the power data from the power data acquirer 20. Then, the waveform model creator 56 defines a start-point of single-cycle based on the size of the computed derivative (sharpness of rise). Accordingly, power data obtained from a period defined between the start of the single-cycle to a point in time that equals to a reciprocal of fundamental frequency can be detected as the single-cycle power data.

[Third Embodiment]

Next, another embodiment of the present invention is described referring to FIGS. 11~17. An energy monitoring system 5 of the present embodiment includes a cycle detector 25 whose function is different from the energy monitoring system 5 shown in FIGS. 1~7. Components having the same functions as described previously are labeled by the same numerical references, and descriptions of these components are omitted.

The cycle detector 25 of the present embodiment detects single-cycle power data by detecting a start-point of the single-cycle from the power data using a design cycle-time value $D_{ct}$ and a frequency analysis. Here, the design cycle-time value $D_{ct}$ refers to a planned value of cycle time defined by a responsible person at the manufacturing site.

Figure 11:
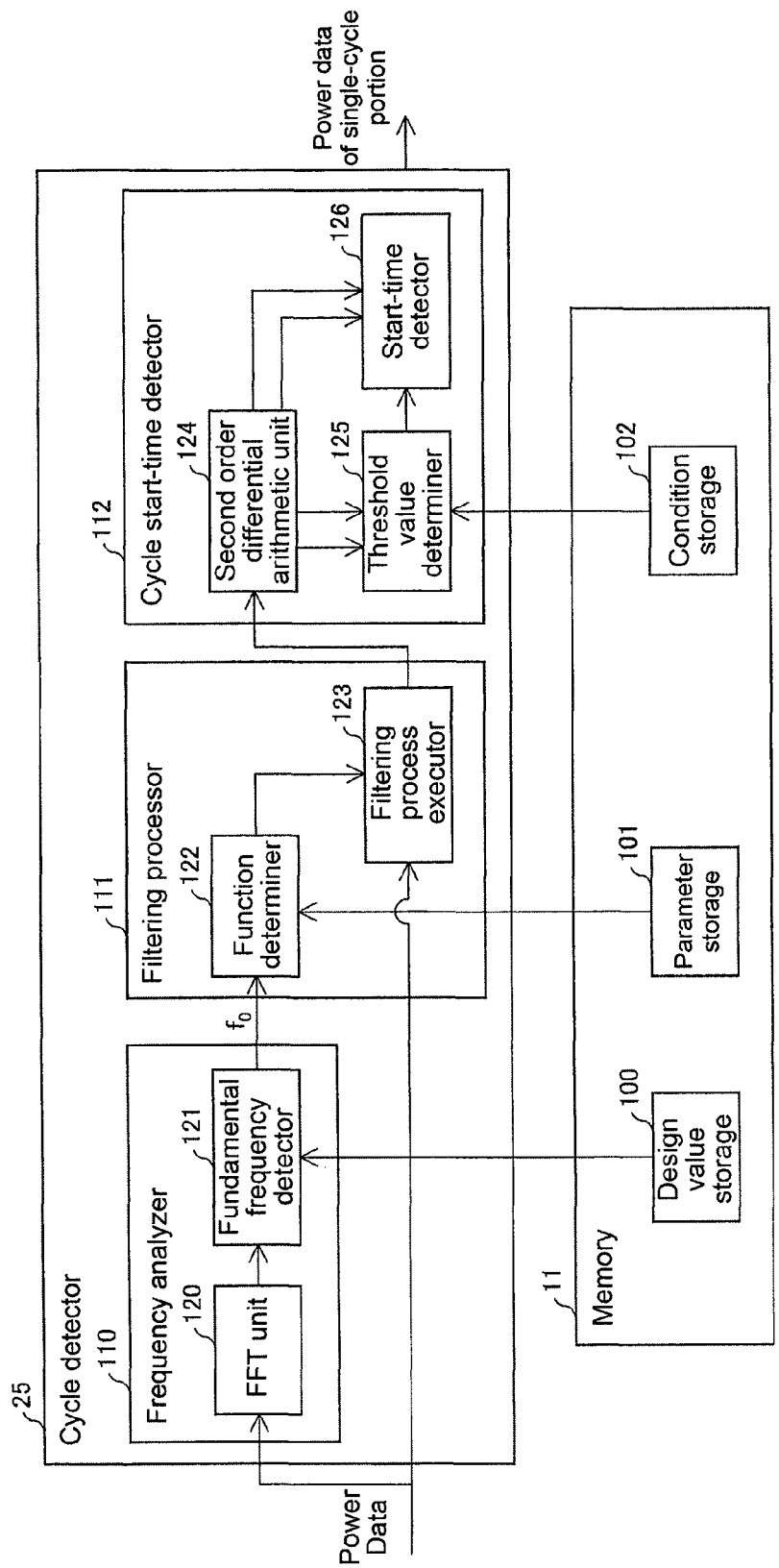
[FIG. 11] A block diagram showing a schematic configuration of an energy monitoring device in an energy monitoring system of another embodiment of the present invention.

FIG. 11 shows a schematic configuration of cycle detector 25 and a memory that stores data used for the cycle detector 25. As shown in the figure, the cycle detector 25 is configured to include a frequency analyzer 110; a filtering processor 111; and a cycle start detector 112. In addition, the memory 11 is configured to include a design value storage 100; a parameter storage 101; and a condition storage 102.

The design value storage 100 stores the design cycle-time value $D_{ct}$. Further, the parameter storage 101 stores various parameter values used for a filtering process by the filtering processor 111. Moreover, the condition storage 102 stores various conditions for detecting the start-point of single-cycle. The design cycle-time value $D_{ct}$, the various parameters, and the various conditions are pre-stored in the design value storage 100, the parameter storage 101, and the condition storage 102, respectively, through the input unit 14 (see FIG. 8).

The frequency analyzer 110 detects fundamental frequency $f_0$ of a periodic waveform. The frequency analyzer 110 detects this by analyzing the frequency of the power data and using the design cycle-time value $D_{ct}$. The frequency analyzer 110 is configured to include FFT unit 120 and a fundamental frequency detector 121.

The FFT unit 120 executes an FFT over the power data within the predetermined duration. The FFT unit 120 sends the post-FFT frequency spectrum data to the fundamental frequency detector 121. Above predetermined duration may be any duration as long as the following various statistical data can be acquired from the power data. For example, it is possible to use a period "$t_a$" having more than several times of a design cycle-time value $D_{ct}$ that allows the operating-state to continue.

The fundamental frequency detector 121 detects a fundamental frequency $f_0$ of a periodic waveform using the frequency spectrum data from the FFT unit 120. The fundamental frequency detector 121 sends the detected fundamental frequency $f_0$ to the filtering processor 111.

In the present embodiment, a range of frequency to detect the fundamental frequency is limited to a predetermined range which includes a reciprocal of design cycle-time value $D_{ct}^{-1}$, where $D_{ct}^{-1}$ is stored in the design value storage 100. Accordingly, the fundamental frequency of the periodic waveform that corresponds to a cycle-time can be reliably acquired.

FIG. 12 is a line chart showing an example of the frequency spectrum near the reciprocal of design cycle-time value $D_{ct}^{-1}$. FIG. 12 describes the method of detecting the fundamental frequency. In FIG. 12, the predetermined range is shown as a range between the dashed lines. The fundamental frequency detector 121 detects a frequency spectrum having the maximum frequency in the range between the dashed lines, and defines the detected spectrum as the fundamental frequency $f_0$. In the present embodiment, a frequency of the predetermined range is set in a range ½ of the reciprocal of design cycle-time value $D_{ct}^{-1}$ to two-fold of $D_{ct}^{-1}$.

The filtering processor 111 executes a filtering process (filtering) on the power data and emphasizes a frequency component near the fundamental frequency $f_0$. The filtering processor 111 is configured to include a function determiner 122 and a filtering process executor 123.

The function determiner 122 determines a function for use in filtering using the fundamental frequency $f_0$ from the fundamental frequency extractor 121. This function for filtering is used in the filtering process. The function determiner 122 sends information relating the determined function for use in filtering to the filtering process executor 123.

In the present embodiment, as the function for filter, the following logistic function f(x) is used. Other functions may be used as a function for filtering.

$$f(x)=1/(1+\exp(s\times(x-f_c)))$$

Here, $f_c$ is a value of "x" when $f=\frac{1}{2}$, and corresponds to a cutoff frequency of the present embodiment. In addition, the cutoff frequency $f_c$=fundamental frequency $f_0 \times$parameter $P_{aram}$ in the present embodiment. And, "s" is set as $0 \leq s \leq 1$ and it indicates a reduction rate of the logistic function.

The filtering process executor 123 executes a filtering process on the power data using the function for filtering from the function determiner 122. The filtering process executor 123 sends post-filtering power data to the cycle start detector 112.

FIGS. 13 (a) and (b) are graphs showing examples of power data, pre-filtering and post-filtering power data processed by the filtering process executor 123. FIGS. 14 (a) and (b) are graphs showing the frequency spectrum of power data shown in FIGS. 13 (a) and (b), respectively.

FIGS. 14 (a) and (b) also show frequency characteristics of the logistic function for filtering determined by the function determiner 122. In the examples of FIG. 14, $f_0 \approx 0.0573$ Hz, $P_{aram}$=3 (therefore, $f_c$=0.1719 Hz), and s=0.1. Further, FIGS. 13 and 14 are examples when the processing machine 3 is an injection molding machine.

When comparing (a) and (b) of FIG. 14, removal of frequency component is observed. The frequency component having a frequency higher than the fundamental frequency $f_0$ and also having a frequency above 0.2 Hz is removed by executing the filtering process. In addition, by comparing (a) and (b) of FIG. 13, it is understood that a cycle waveform becomes more distinct by executing the filtering process.

The cycle start detector 112 detects a start-point of a single-cycle. When the processing machine 3 starts processing a work, the electric power consumption often abruptly increases. Indeed, by referring to the post-filtering power data shown in FIG. 13 (b), it is understood that a sharp rise of power occurs periodically.

Accordingly, when a rise of post-filtering power is detected, a start-point of the single-cycle can be detected. In the present embodiment, at a time when the post-filtering power rises, it is defined as the start-point of the single-cycle.

Figure 15:
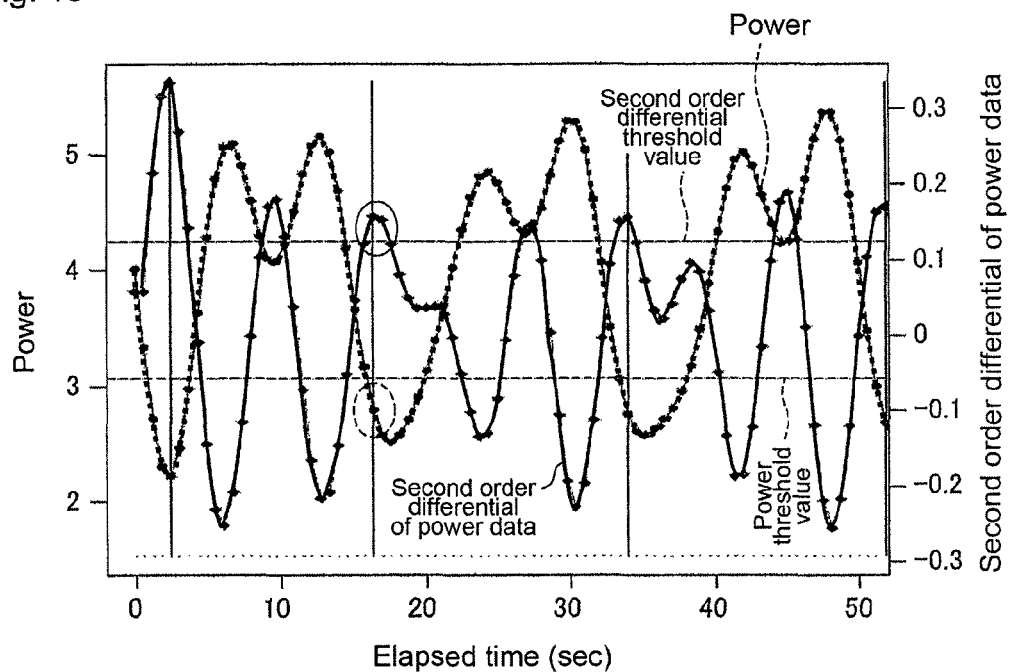
[FIG. 15] A graph showing post-filtering process power data and its second order differential data.

There are various methods to determine the rising of post-filtering power. The detection method in the present embodiment is described referring to FIG. 15. FIG. 15 is a graph showing the post-filtering power data and its second order differential data. In the figure, a dashed line indicates the post-filtering power data and a solid line indicates the second order differential data.

As shown in FIG. 15, the post-filtering power immediately before the power rises is small. Over time, a slope of the post-filtering power abruptly increases from negative to positive. Thus, the second order differential value of the post-filtering power becomes large. Accordingly, a timing that satisfies a following condition is defined as the time when the post-filtering power rises. The condition requires the post-filtering power to be lower than one threshold value and also the second order differential value to be higher than another threshold value. For example, in FIG. 15, portions circled by a same line type as that of the graph satisfy the above requirements. Therefore, the circled portion is identified as the time when the post-filtering power rises. Accordingly, the threshold value related to the post-filtering power is defined as a power threshold. The threshold value related to the second order differential is defined as a second order differential threshold. The requirements described above is defined as a rising detection requirement.

Additional requirements may be added to the rising detection requirement. For example, even when the slope of the post-filtering power rises sharply but decreases immediately, the post-filtering power is suppressed from increasing. Hence, this cannot be referred to as the rising indicated above. Thus, a requirement such as having the post-filtering power greater than the power threshold value, in which the post-filtering power is taken at a predetermined time (i.e., 5 sec) past the time that satisfies the above-discussed requirements, may be additionally included.

Further, as shown in FIG. 15, the rising detection requirements may be satisfied at not only a single timing but also a plurality of timings including the single timing. In a period defined by either 0.5 times or less of the design cycle-time value $D_{ct}$ or 0.5 times or less of the fundamental period $T_0$ which is a reciprocal of the fundamental frequency $f_0$, a plurality of instances that satisfy the rising detection requirement may exist. In this case, a timing at which the second order differential value has the maximum value is defined as the rising timing of the post-filtering power data. This may be additionally included in the rising detection requirement.

Next, a method to determine the power threshold value and the second order differential value is described. By referring to FIG. 15, it is understood that there is a need for the post-filtering power less than the power threshold to exist periodically. Thus, a power threshold value is determined so that it detects the post-filtering power lower than the power threshold value to occur periodically.

Figure 16:
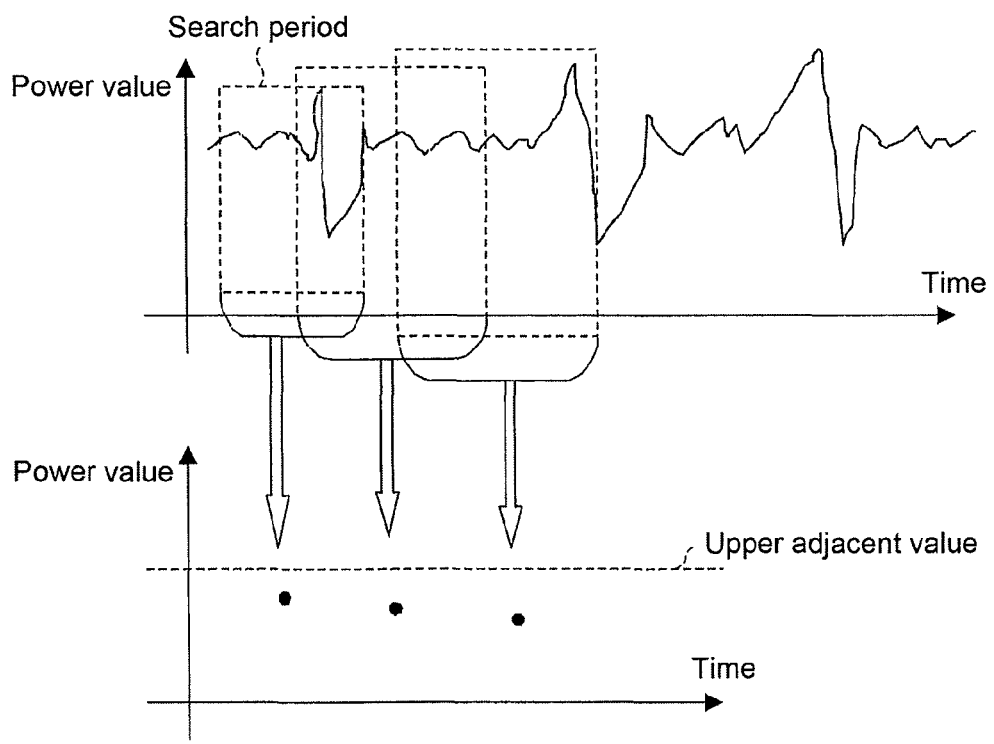
[FIG. 16] A graph showing a method to determine an electric power threshold value by an electric power threshold value determiner in the energy monitoring device.

FIG. 16 shows a graph that defines the power threshold value. A top graph in FIG. 16 shows changing of power data over time, and dashed lines in the graph indicate respective search sections. A bottom graph in FIG. 16 shows medians of predetermined number of power data having lower value within the respective search section.

The predetermined number may be defined by the actual number or an equation to obtain the predetermined number. As an example, the following equation is listed.

$$\text{Predetermined Number}=a/(f_0 \times t_{sampling})(\text{round up the decimal point})$$

Here, $t_{sampling}$ indicates a sampling cycle of data measurement. Further, $(f_0 \times t_{sampling})^{-1}$ indicates data number with respect to a fundamental period $T_0$ ($=1/f_0$) while "a" indicates its coefficient. In the present embodiment, a=0.3. For example, when $f_0$=0.1719 Hz and $t_{sampling}$=0.6 sec, the predetermined number=3, thus medians of three power data having lower value are computed.

As shown in FIG. 16, in the present embodiment, the predetermined search section is designated at an upstream direction of one time. Then, the medians of predetermined numbers of power data having a lower value within the respective search sections are computed. It is desirable that the search section includes a wider duration than the fundamental period $T_0$.

Next, the search section shifts to a downstream direction by a predetermined period, and executes and repeats the same processes described above. Then, an upper adjacent value with respect to a group of computed median power data is defined. This upper adjacent value becomes the power threshold value. It is desirable that the predetermined period be shorter than the fundamental period $T_0$, and more preferably, to be about half of the fundamental period $T_0$.

Here, the upper adjacent value is defined as maximum power data in a range downstream of (upper hinge U)+(H-spread h×a). Further, the H-spread h indicates a difference between an upper hinge U and a lower hinge. The upper hinge indicates a median of data above the median of all data (75th percentile value). The lower hinge indicates a median of data below the median of all data (25th percentile value). A parameter "a" typically is 1.5, however, "a" is 2 in the present embodiment considering a margin to successfully detect the rising.

The second order differential threshold value can be defined by a method opposite to the power threshold value. In detail, by referring to FIG. 15, some power needs to periodically exceed the second order differential threshold value. Accordingly, a value that allows a detection of power which periodically exceeds that value, is defined as the second order deferential threshold value.

In the present embodiment, the predetermined search section is designated at an upper direction of a certain time. In the second order differential data within the search section, a median of predetermined number of power data having a higher value is computed. Next, the search section is shifted downstream by a predetermined duration and executes and repeats the same processes described above. And, a lower adjacent value over a group of computed medians is defined as the above second order differential threshold value. Here, the lower adjacent value indicates minimum power data in a range above (lower hinge L)–(H-spread h×a).

Accordingly, the cycle start detector 112 detects a timing when the power rises as the cycle start-point by using the post-filtering power data from the filtering process executor 123 and its second order differential value. The cycle start detector 112 is configured to include a second order differential arithmetic unit 124; a threshold value determiner 125; and a start-time detector 126. In addition, the condition storage 102 stores the predetermined search section, the predetermined number, the predetermined duration, and the parameter "a".

The second order differential arithmetic unit 124 executes a second order differential arithmetic operation on the post-filtering power data received from the filtering process executor 123. The second order differential arithmetic unit 124 sends computed second order differential data and the above post-filtering power data to the threshold value determiner 125 and the start-time detector 126.

As described above, the threshold value determiner 125 defines the power threshold value and the second order differential threshold value. The threshold value determiner 125 uses the post-filtering power data, the second order differential data from the second order differential arithmetic unit 124, the predetermined search section, the predetermined number, the predetermined duration, and the parameter "a" stored in the condition storage 102 to define the two threshold values. The threshold value determiner 125 sends the defined power threshold value and the defined second order differential threshold value to the start-time detector 126.

The start-time detector 126 detects a start-point of a single cycle using the post-filtering power data, the second order differential data, the power threshold value, and the second order differential threshold value based on the above described rise detection condition. The second order differential data is from the second order differential arithmetic unit 124. The power threshold value and the second order differential threshold value are from the threshold value determiner 125. Thus, the cycle detector 25 can detect the power data for a single-cycle portion.

Figure 17:
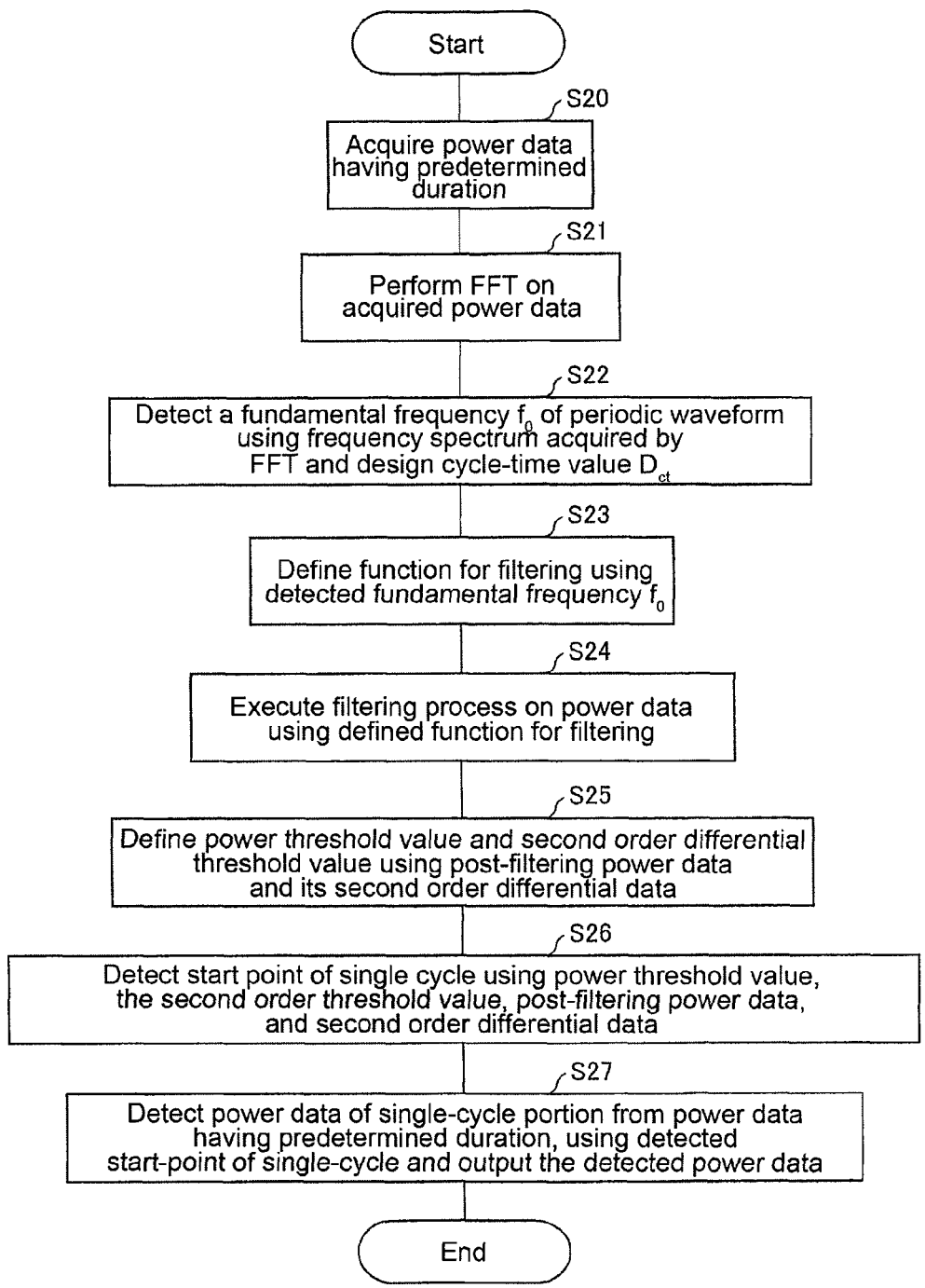
[FIG. 17] A flow chart schematically showing processes executed by a controller in the energy monitoring device.

Next, referring to FIG. 17, processes executed by the controller 10 of the above configured energy monitoring device 1 is described. FIG. 17 schematically shows processes executed by the cycle detector 25 in the controller 10.

As shown in FIG. 17, at first, the cycle detector 25 acquires power data having predetermined duration from the power data storage 30 (S20). Next, an FFT is executed on the acquired power data by the FFT unit 120 (S21). The fundamental frequency detector 121 detects fundamental frequency $f_0$ of a periodic waveform using a frequency spectrum data acquired by the FFT and a design cycle-time value $D_{ct}$ stored in the design value storage 100 (S22).

Next, the function determiner 122 defines a function for use in filtering using the detected fundamental frequency $f_0$ and the various parameters stored in the parameter storage 101 (S23). Then, the filtering executor 123 executes the filtering process on the power data using the defined function for filtering (S24).

Next, the second order differential arithmetic unit 124 computes a second order differential of the post-filtering power data. The threshold determiner 125 then defines a power data threshold value and a second order differential threshold value using the second order differential data acquired from the computation result, the post-filtering power data and the various data being stored in the condition storage 102 (S25). Next, the start-time detector 126 detects a start-point of a single-cycle using the defined power data threshold value, the defined second order differential threshold value, the post-filtering power data, and the second order differential data based on the rise detection condition (S26). Then, the cycle detector 25 detects power data of a single cycle portion using the detected start-point of the single-cycle, in which the power data of the single cycle portion is detected from the power data having a predetermined duration acquired from the power data storage 30. Then, the cycle detector 25 outputs the power data of the single cycle portion (S27). Thereafter, the execution of processes is completed.

Accordingly, the start-point of the single-cycle can be detected using the power data and the various defined values in the present embodiment, hence there is no need to use a waveform pattern.

In the present embodiment, timing at which the power rises is defined as the start-point of the single-cycle, however, there exists some processing machines 3 that perform preparation for the operations prior to starting the operations (see to FIG. 6). In this case, a starting point of preparation becomes a start-point of a single-cycle, thus being shifted from the start-point of the operation. In another words, the start-point of the power rising is also shifted. However, in the operations of processing machine 3, the preparation period may be well-known in advance, and/or power data from that period may often include unique characteristics. Accordingly, the preparation start-time, namely the start-point of the single-cycle, can be easily detected by detecting the start-point of power rising.

Further, similar to detecting the rising of power, falling of power may be detected. In this case, a period between the rising time of power and the falling time of power becomes net operating-state period $t_{av}$ (see FIG. 2), therefore an added-value creating period can be determined.

[Fourth Embodiment]

Figure 18:
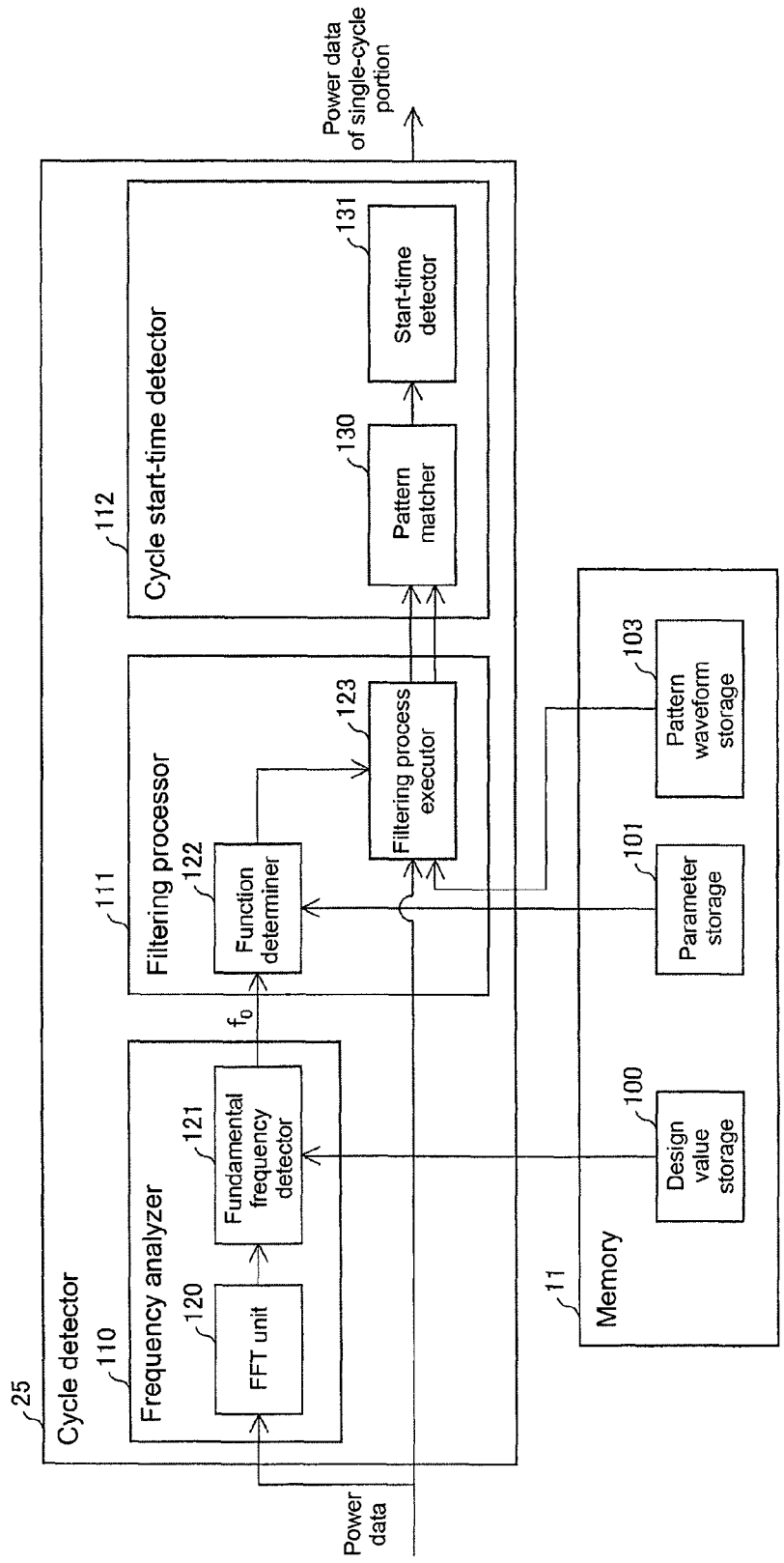
[FIG. 18] A block diagram showing a schematic configuration of an energy monitoring device in an energy monitoring system of another embodiment of the present invention.
Figure 19:
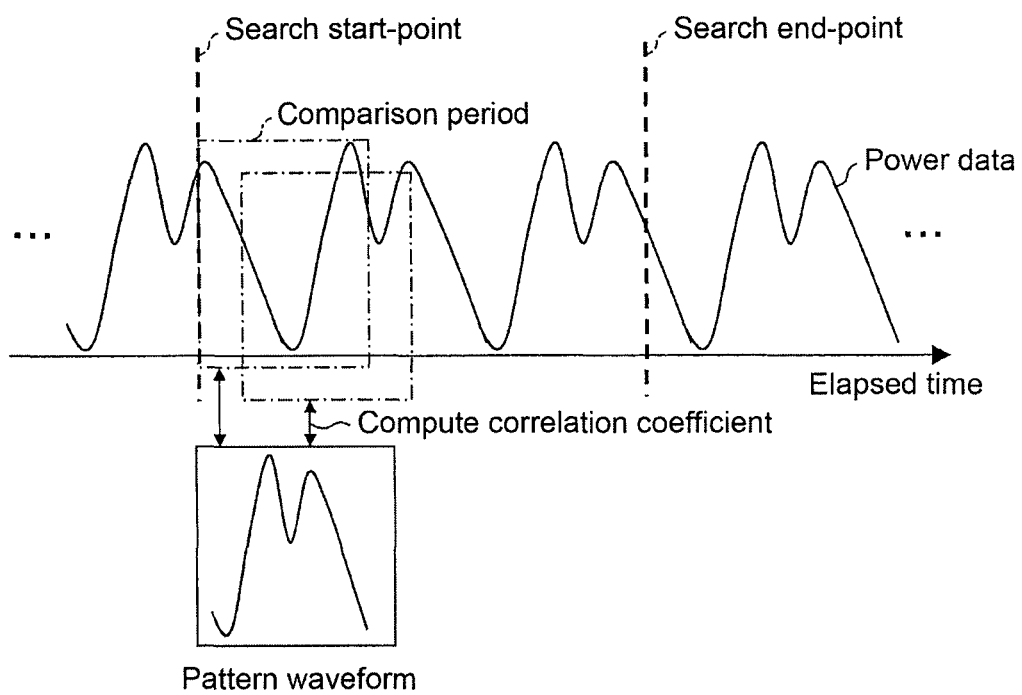
[FIG. 19] A graph detailing pattern matching executed by a pattern matcher in the energy monitoring device.
Figure 20:
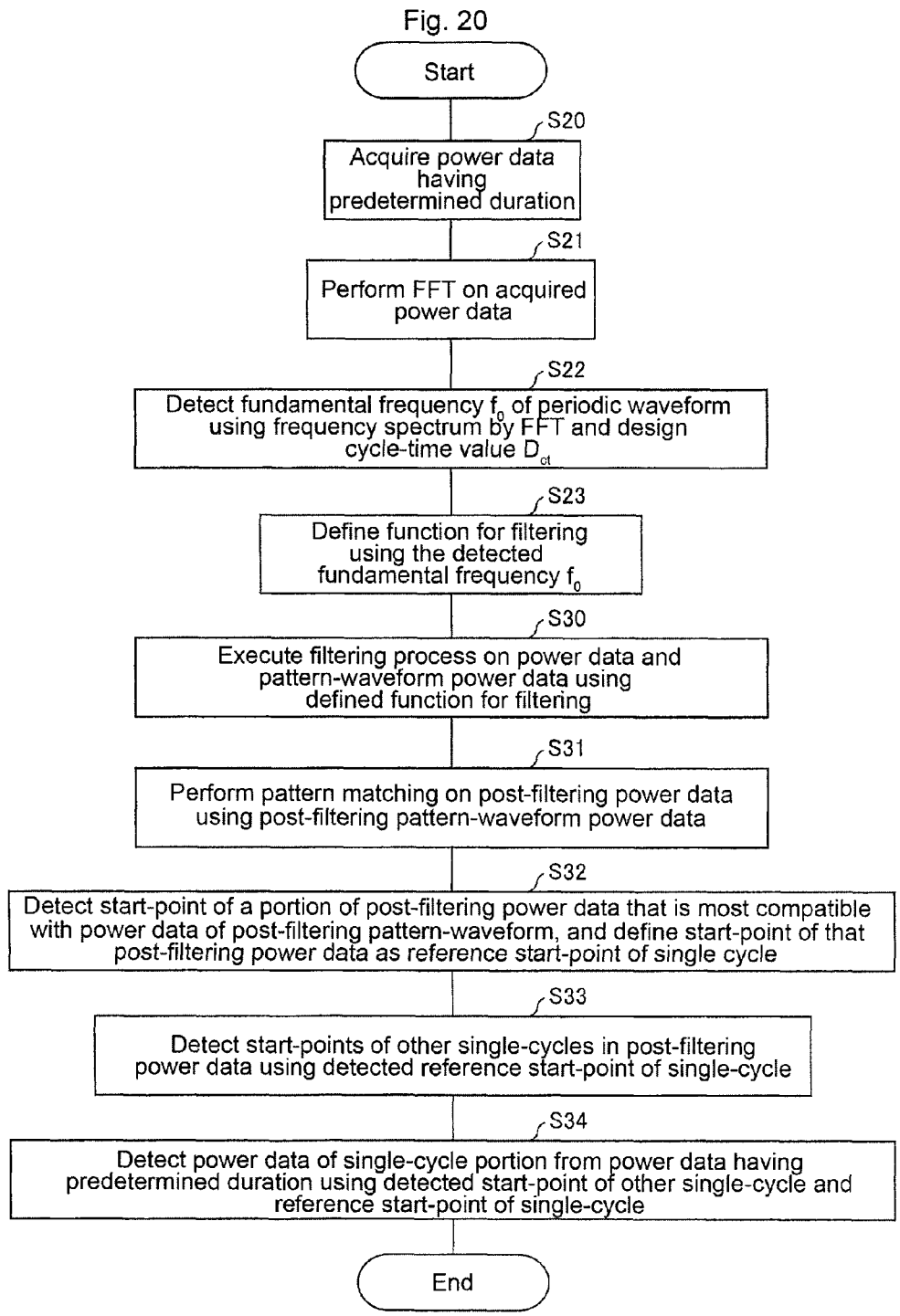
[FIG. 20] A flow chart diagram schematically showing processes executed by a controller in the energy monitoring device.

Next, another embodiment of the present invention is described referring to FIGS. 18~20. FIG. 18 shows a schematic configuration of a cycle detector 25 included in a controller 10 and a memory that stores data used by the cycle detector 25. The cycle detector 25 and the memory are included in an energy monitoring device 1 of an energy monitoring system 5 of the present embodiment.

The energy monitoring system 5 of the present embodiment differs from the energy monitoring system 5 shown in FIGS. 11~17 in the operations of cycle start detector 112 in the cycle detector 25, and differs in having a pattern-waveform storage 103 instead of the condition storage 102 in the memory 11. Components having the same functions as those described above are labeled by the same numerical references and descriptions of these components are omitted.

The pattern-waveform storage 103 stores pattern-waveform information related to a respective pattern-waveform of single-cycle power data. Instead of the pattern-waveform storage 103, the waveform model DB storage 31 may be used. In that case, waveform model information in the waveform model DB storage 31 becomes the pattern-waveform information.

The cycle detector 25 of the present embodiment uses a design cycle-time value $D_{ct}$, frequency analysis, and a pattern matching to detect a start-point of single-cycle from the power data. Then, the cycle detector 25 detects power data of the single-cycle. As shown in FIG. 18, a cycle start detector 112 of the cycle detector 25 is configured to include a pattern matcher 130 and a start-time detector 131.

The pattern matcher 130 executes pattern matching (template matching) on post-filtering power data acquired from the power data storage 30 through the filtering process executor 123. The pattern matcher 130 uses the post-filtering pattern-waveform power data acquired from the pattern-waveform storage 103 through the filtering process executor 123 to execute the pattern matching.

As a result of the pattern matching, the pattern matcher 130 identifies a portion of the post-filtering power data that is most compatible with the power data of the post-filtering pattern-waveform. Then, the pattern matcher 130 detects a start-point of the relevant compatible portion as a reference start-point of a single-cycle. The pattern matcher 130 sends the detected reference start-point of the single-cycle to the start-time detector 131. In the present embodiment, an extent of matching (evaluation standard) is shown by a correlation coefficient, but the matching extent can be shown by an evaluation standard known to public such as a convolution integral, and the like.

FIG. 19 is a graph showing the details of the pattern matching. A top graph in FIG. 19 shows a variation of post-filtering power data over time. Dashed-dotted lines in the graph respectively show comparing sections. A bottom graph in FIG. 19 shows power data having the pattern waveform of the post-filtering process. The comparing sections and the sections where power data of the pattern waveform of the post-filtering process is obtained are the same.

As shown in FIG. 19, in the present embodiment, a search start-point is designated at a suitable time and the comparing section is designated downstream of the search start-point. Next, the correlation coefficient between the power data in the defined comparing section and the power data of the pattern-waveform is computed.

Next, the comparing section shifts in a downstream direction and the same processes above are repeated until the start-point of the comparing section reaches a search end-point. Then, the start-point of the comparing section having a maximum correlation coefficient is defined as a reference start-point of a single-cycle, and the defined reference start-point of the single-cycle is sent to the start-time detector 131.

The search start-point may exist at a leading edge or a center of the post-filtering power data. Further, shifting direction of the comparing section may be upstream or downstream direction. In addition, a period from the search start-point and the search end-point may depend on the design cycle-time value $D_{ct}$, such as equal to twice as much as the design cycle-time value $D_{ct}$, or may be fixed. Moreover, the comparing section may be shifted per power or be shifted per a group of power.

The start-time detector 131 detects start-points of other single cycles in the post-filtering power data using the reference start-point of the single-cycle from the pattern matcher 130. The cycle detector 25 can detects power data of a single-cycle portion using the reference start-point of single-cycle detected by the pattern matcher 130 and the detected start-point of single-cycle by the start-time detector 131.

Methods of detecting the start-points of other single cycles by the start-time detector 131 may include the following two methods. A first method uses a fundamental period $T_0$ which is a reciprocal of fundamental frequency $f_0$ detected by the fundamental frequency detector 121. With this method, the reference start-point of single-cycle is set as an origin, and points in time elapsed from the origin and also from each other with an interval of fundamental period $T_0$ are defined as the start-points of the respective other single cycles. Instead of fundamental period $T_0$, predetermined period that corresponds to a cycle time such as design cycle-time value $D_{ct}$, and the like may be used.

A second method defines the search start-point and the search end-point before or after the start-point of single cycle is detected by the first method. The defined search start-point and search end-point are sent to the pattern matcher 130. Then, the start-time detector 131 receives the reference start-point of single-cycle in a period between the search start-point and the search end-point from the pattern matcher 130. Compared with the first method, the second method requires a larger amount of process, but can detect a starting point of a single-cycle with increased accuracy.

It is preferred that the search start-point be a point in time just before (i.e., fundamental period $T_0 \times 0.1$, and the like) the start-point of the single cycle. It is preferred that the search end-time be a point in time in which a predetermined duration (i.e., fundamental period $T_0$, design cycle-time value $D_{ct}$, and the like) elapsed from the search start-point.

Next, processes executed by the controller 10 in the above configured energy monitoring device 1 are described referring to FIG. 20. FIG. 20 schematically shows processes executed by the cycle detector 25 in the controller 10. Meanwhile, steps of processes from acquiring power data having predetermined duration from the power data storage 30 (S20) to defining a function for use in filtering by the function determiner 122 (S23) are the same as those shown in FIG. 17. Accordingly, descriptions of these steps are omitted.

After S23, the filtering process executor 123 performs a filtering process on the power data using the defined function for use in filtering. The filtering process executor 123 also performs a filtering process on a pattern-waveform power data acquired from the pattern-waveform storage 103 (S30). Next, the pattern matcher 130 compares a pattern of the post-filtering power data using the post-filtering pattern-waveform power data (S31). Then, upon pattern matching, the pattern matcher 130 detects a start-point of the post-filtering power data, whose data most closely matches with the post-filtering pattern-waveform power data, as a reference start-point of the single-cycle (S32).

Next, the start-time detector 131 detects start-points of other single-cycles in the post-filtering power data using the detected reference start-point of the single-cycle (S33). Then, the cycle detector 25 detects the power data of the single-cycle portion within the power data having the predetermined duration acquired from the power data storage 30. The cycle detector 25 uses the detected start-point of the other single-cycle and the detected fundamental start-point of single-cycle to detect the power data of single-cycle portion. The cycle detector 25 then outputs the detected power data of the single-cycle portion (S34), and ends the processes.

The pattern-waveform storage 103 may store the above post-filtering pattern waveform information. In this case, the pattern matcher 130 can acquire the post-filtering pattern waveform information directly from the pattern-waveform storage 103. Further, it is preferred that the filtering process executed on the pattern waveform information be the same as the filtering process executed by the filtering process executor 123.

[Fifth Embodiment]

Figure 21:
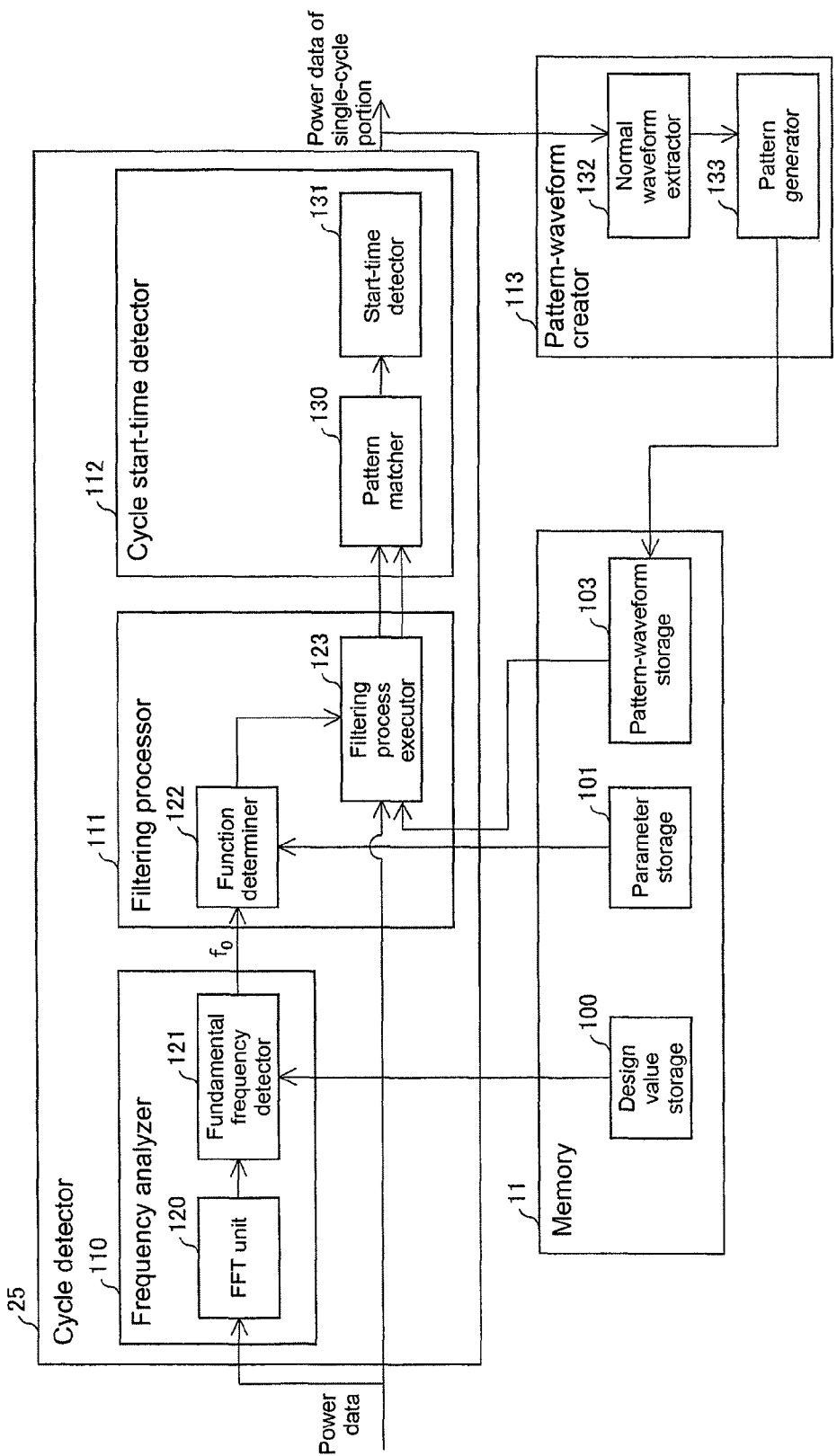
[FIG. 21] A block diagram showing a schematic configuration of an energy monitoring device in an energy monitoring system of another embodiment of the present invention.
Figure 22:
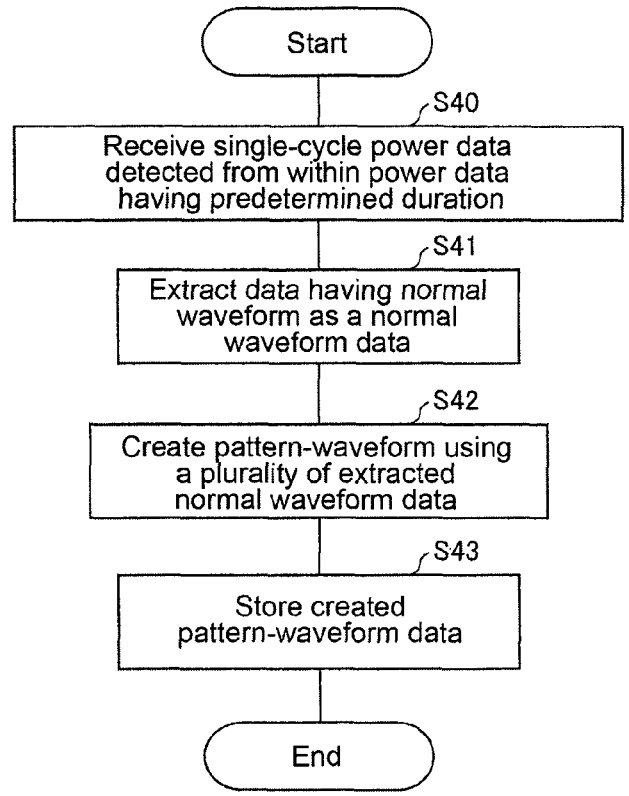
[FIG. 22] A flow chart diagram schematically showing processes executed by a controller in the energy monitoring device.

Next, another embodiment of the present invention is described referring to FIGS. 21 and 22. An energy monitoring system 5 of the present embodiment differs from the energy monitoring system 5 shown in FIGS. 18~20 in a controller 10. A pattern-waveform creator 113 is added in the controller 10. Components having the same functions as those described above are labeled by the same numerical references and descriptions of these components are omitted.

FIG. 21 shows a schematic configuration of a cycle detector 25 and a pattern-waveform creator 113 in the controller 10, and a memory that stores data for these components in an energy monitoring device 1 of the energy monitoring system 5 of the present embodiment. The cycle detector 25 in FIG. 21 is identical with the cycle detector 25 shown in FIG. 18, thus description is omitted.

The pattern-waveform creator 113 creates a pattern-waveform of a single-cycle power data using a single-cycle power data detected by the cycle detector 25. As shown in FIG. 21, the pattern waveform creator 113 is configured to include a normal waveform extractor 132 and a pattern creator 133.

The normal waveform extractor 132 receives single-cycle power data from the cycle detector 25 and extracts one that includes a normal waveform within the received single-cycle power data. Hereafter, a single-cycle power data having a normal waveform is referred to as normal waveform data. The normal waveform extractor 132 sends the extracted normal waveform data to the pattern creator 133.

A method to decide whether the waveform is normal by the normal waveform extractor 132 is explained. First, a single or a plurality of feature values Fi is pre-selected to distinguish a waveform of the single-cycle. In the present embodiment, cycle time F1 and sum of single-cycle power F2 are used as the feature value Fi. Other examples of Fi include basic statistic data, such as: average; variance; standard deviation; root mean square; maximum value; minimum value; kurtosis; and skewness. The kurtosis indicates a peakedness of a distribution of single-cycle power data against a normal distribution. Further, the skewness indicates how skewed a distribution of single-cycle power data is against a normal distribution.

Next, the feature value Fi is computed for each of the single-cycle power data received, and a median mdi and a standard deviation sdi are computed from a set of computed feature values Fi. This process is repeated for each feature value Fi.

Then, a single-cycle power data that satisfies a required condition for all feature values Fi is extracted as the normal waveform data, and sends the normal waveform data to the pattern creator 133. The condition requires that an absolute value of a difference between the feature value Fi and the median mdi, abs (Fi−mdi), be smaller than the standard deviation sdi for all Fi. In the present embodiment, single-cycle power data that satisfies the following conditions is extracted; abs (F1−md1)<sd1; and abs (F2−md2)<sd2.

The pattern creator 133 creates the pattern-waveform using a plurality of normal waveform data from the normal waveform extractor 132. Specifically, the pattern creator 133 extracts power values from the plurality of normal waveform data where each power value is extracted at a time when an equal duration from the respective start-point has elapsed. Then, a median of the plurality of extracted power values is computed. The computed median is defined as power of a pattern waveform of the elapsed period. This process is repeated for all elapsed period so as to create pattern waveform. The pattern waveform creator 133 stores the created pattern waveform data in the pattern-waveform storage 103.

Next, processes executed by the controller 10 in the above configured energy monitoring device 1 are explained referring to FIG. 22. FIG. 22 schematically shows processes executed by the pattern-waveform creator 113 in the controller 10.

As shown in FIG. 22, initially, when the cycle detector 25 receives single-cycle power data detected from the power data having predetermined duration (S40), the normal waveform extractor 132 extracts a waveform having a normal shape as the normal waveform data (S41). Next, the pattern creator 133 creates a pattern-waveform using a plurality of extracted normal waveform data (S42), and stores created pattern-waveform data in the pattern-waveform storage 103 (S43). Thereafter, the processes are completed.

Accordingly, in the present embodiment, even without knowing the pattern-waveform in advance, an appropriate pattern-waveform can be automatically obtained.

The single-cycle power data received by the pattern-waveform creator 113 may be a post-filtering data processed by the filtering processor 111 or unfiltered data. Further, the pattern-waveform creator 113 may use single-cycle power data detected by another detecting method.

[Sixth Embodiment]

Next, another embodiment of the present invention is described referring to FIGS. 23~26. An energy monitoring system 5 of the present embodiment differs from the energy monitoring system 5 shown in FIGS. 1~7 in the operations of a divider 26. Components having the same functions as those described above are labeled by the same numerical references and descriptions of these components are omitted.

The divider 26 of the present embodiment defines a start-point of an unproductive period $t_{an}$ from single-cycle power data detected by the cycle detector 25 using a statistical process. With this, dividing conditions can be created from a waveform model, therefore there is no need to pre-store the dividing conditions in the waveform model DB storage 31. In addition, an added-value creating period $t_{av}$ and an unproductive period $t_{an}$ can be identified from single-cycle power data, thus there is no need to use the waveform model DB storage 31.

Next, the divider 26 of the present embodiment is explained in detail. In the present embodiment, a start-point of a single-cycle is defined as a timing when the power rises. A period before the rise is an added-value creating period $t_{av}$, and a period after the rise time is an unproductive period $t_{an}$.

In general, the processing machine 3 is operating in the added-value creating period $t_{av}$, hence the electric power consumption is higher in the added-value creating period $t_{av}$. On the other hand, the processing machine 3 is not operating in the unproductive period $t_{an}$, thus the electric power consumption is low. Therefore, a transition point when the higher electric power consumption level changes to a lower electric power level is defined as the start-point of the unproductive period $t_{an}$ (end-point of the added-value creating period $t_{av}$).

In order to define the transition time, a feature value f(t) in the following formula is used.

$$f(t)=|\{(\text{average of power data of period } Ls)-(\text{average of power data of period } Rs)\}^2|/\{(\text{variance of power data of period } Ls)+(\text{variance of power data of period } Rs)\}$$

Here, a period Ls stands for a period before a point "t" in time and a period Rs stands for a period after a point "t" in time. When the point "t" is the transition point, average power data of the period Ls becomes large and average power data of the period Rs becomes small. Variance of power data from the period Ls and Rs becomes smaller, therefore the feature value f(t) becomes greatest. In other words, when the feature value f(t) is at the greatest, the point "t" becomes the transition point, the period Ls becomes the added-value creating period $t_{av}$, and the period Rs becomes the unproductive period $t_{an}$. Accordingly, by defining the point "t" that specifies the maximum feature value f(t) in the single-cycle power data, the single-cycle power data can be divided into the added-value creating period $t_{an}$ power data and the unproductive period $t_{an}$ power data.

Figure 23:
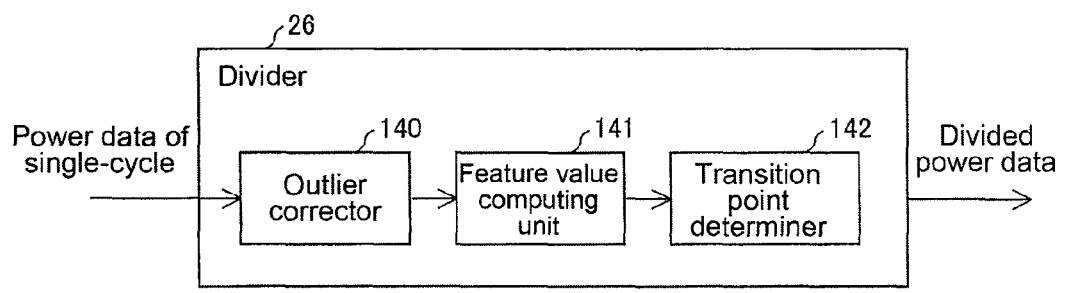
[FIG. 23] A block diagram showing a schematic configuration of an energy monitoring device in an energy monitoring system of another embodiment of the present invention.

FIG. 23 shows a schematic configuration of the divider 26. As shown, the divider 26 is configured to include an outlier corrector 140; a feature value computing unit 141; and a transition point determiner 142.

As a pre-process to compute a feature value f(t), the outlier corrector 140 corrects an outlier that exists in a single-cycler data obtained from the cycle detector 25. The outlier corrector 140 sends the corrected single-cycle power data to the feature value computing unit 141.

A method of correction by the outlier corrector 140 is explained in detail by referring to FIG. 24. FIG. 24 shows examples of correction executed by the outlier corrector 140. FIG. 24 (a) shows single-cycle power data before correction and FIG. 24 (b) shows post-correction single-cycle power data.

As shown in FIG. 24, first, the outlier corrector 140 computes the average single-cycle power data and temporarily divides the single-cycle power data into data having higher power data than the average ("upper"), and data having lower power data than the average ("lower"). Next, the outlier corrector 140 computes a median of the upper, m_u, and a median of the lower, m_l. It is not desirable to use an average value instead of a median because the outliers are included in the average.

Within the data 'upper,' data having more than m_u+|m_u−m_l| is defined as an outlier, and such power data is corrected to m_u.

The feature value computing unit 141 computes a feature value f(t) for all time "t" in the single-cycle using the corrected single-cycle power data sent from the outlier corrector 140. The feature value computing unit 141 sends the computed feature values f (t) to a transition point determiner 142.

The transition point determiner 142 uses the feature value f(t) from the feature value computing unit 141 and defines the time "t," at which the feature value f(t) becomes greatest, as the transition point. The transition point is set to be the start-point of the unproductive period $t_{an}$ (end-point of the added-value creating period $t_{av}$). Accordingly, the divider 26 can divide the single-cycle power data into power data of the added-value creating period $t_{av}$ and power data of the unproductive period $t_{an}$.

FIG. 25 shows a graph indicating the corrected single-cycle power data and the feature value f(t). A thick line in the figure indicates the corrected single-cycle power data, and a thin line indicates the feature value f(t). As shown, at the time "t" when the feature value f(t) is at the greatest, the single-cycle power data can be divided into the power data of the added-value creating period $t_{av}$ and the power data of the unproductive period $t_{an}$.

Figure 26:
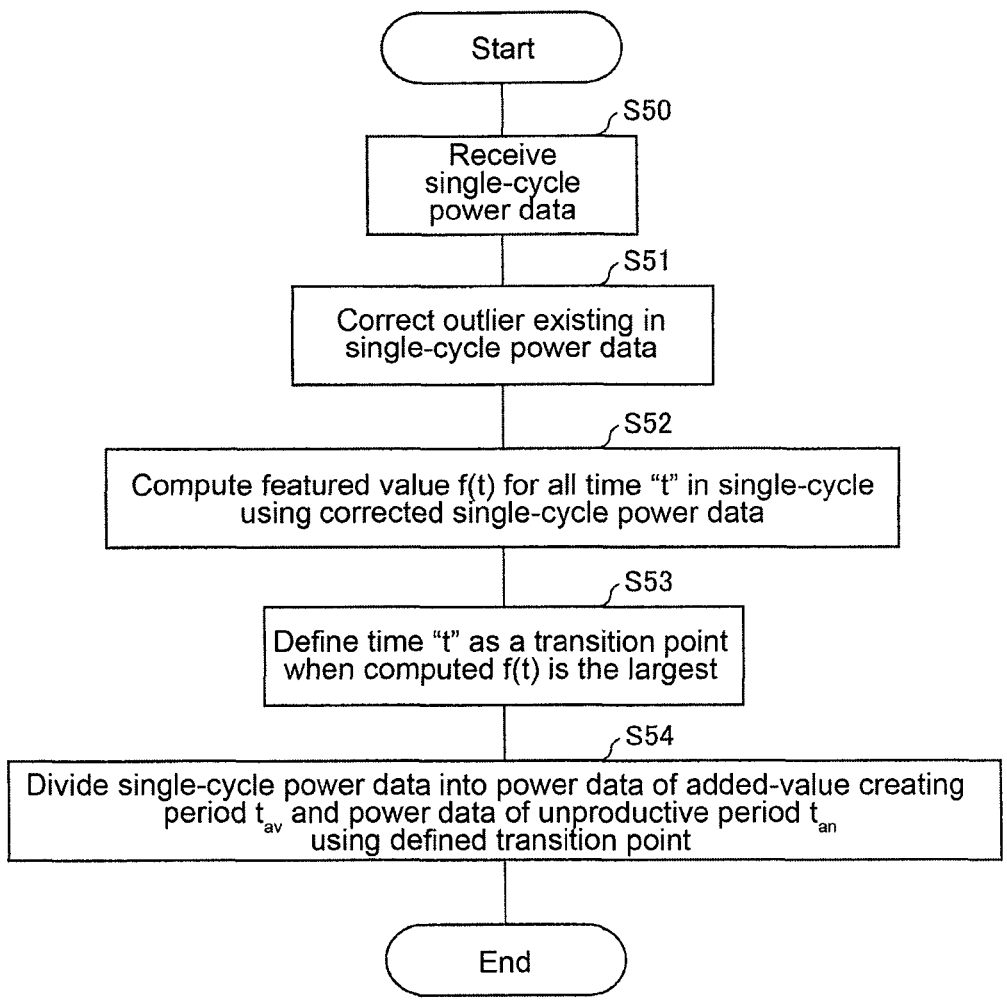
[FIG. 26] A flow chart diagram schematically showing processes executed by a controller in the energy monitoring device.

Next, processes executed by the controller 10 in the above configured energy monitoring device 1 is explained by referring to FIG. 26. FIG. 26 schematically shows processes executed by the divider 26 in the controller 10.

As shown in FIG. 26, when the detected single-cycle power data from the cycle detector 25 is received (S50), the outlier corrector 140 corrects the outlier that exists in the single-cycle power data (S51). Next, the feature value computing unit 141 computes the feature value f (t) for all time "t" in the single-cycle using the corrected single-cycle power data (S52). The transition point determiner 142 defines the time "t" at which the computed feature value f(t) becomes the greatest, as the transition point (S53). Then, the divider 26 divides the single-cycle power data into the power data of the added-value creating period $t_{av}$ and the power data of the unproductive period $t_{an}$ using the defined transition point and outputs the data (S54). Thereafter, the processes are completed.

In the present embodiment, only a max time "t1" at which the feature value f(t) becomes the greatest, is defined to divide the single-cycle into two durations. However, a second largest time "t2" and/or a third largest time "t3" may be defined. Then, it is also possible to divide the single-cycle into three or more parts when a condition is satisfied that requires t1~t3 not be provided adjacent to each other.

The present invention is not limited to the above embodiments. Various changes are possible within a scope of claims, and embodiments obtained from appropriate combination of technology disclosed in the different embodiments are also included in the scope of this invention.

For example, in the embodiments above, electric power consumption is used as consumed energy, however, heat generated from burning the combustible fluid such as natural gas, petroleum, and the like can also be used. In this case, it is only necessary to use a flow meter to monitor the flow volume of the combustible fluid.

In the embodiments above, an electric energy consumed by the processing machine 3 that performs operations on a work is monitored. However, monitoring of electric energy consumption can be also performed by monitor home appliances and natural gas appliances because these power data from home often varies in cycle, for example, per 1 day or per 1 year. Accordingly, the present invention can set on a target device that performs any operations.

Further, single-cycle power data is detected in the embodiments above, but power data that includes a plurality of single-cycle may be detected. Depending on the target product, no distinctive waveform appears in the power data. In this case, an amount for improvement for the processing machine 3 can be computed by detecting the power data having predetermined duration.

Lastly, each block in the energy monitoring device 1, especially the power data acquirer 20, the waste evaluator 21, the display controller 22, the detected data acquirer 50, and the model DB creator 51 may be configured by a hardware logic, or realized by software in CPU as follows.

Namely, the energy monitoring device 1 includes a CPU (central processing unit) which executes control programs to actuate each function, a ROM (read only memory) that stores the programs, a RAM (random access memory) that accesses the programs, and a storage such as a memory or the like (recording medium) that stores the programs and various data. It is also possible to provide a computer readable memory medium in the energy monitoring device 1, where the memory medium stores software, namely the program code (executable program, intermediate code program, source program) to control the energy monitoring device 1.

The computer (CPU or MPU) then reads and executes the program code to accomplish the object of the present invention discussed above.

The recording medium includes, for example, tape format medium such as magnetic tape; cassette tape and the like; a disc format medium such as a floppy disc (registered trademark), a magnetic type disc such as a hard disc and the like; an optical disc such as CD-ROM/MO/MD/DVD/CD-R and the like; card type medium such as IC card (includes memory card)/optical card and the like; a semiconductor memory format medium such as mask ROM/EPROM/EEPROM/Flash ROM and the like; or the like.

Further, the energy monitoring device 1 may be configured to connect to a communication network to provide the program code via communication network. The communication network is not limited to any specific network and may include, for example, the internet; an intranet; an extranet; LAN, ISDN, VAN, CATV communication network; VPN (virtual private network); telephone network; a mobile communication network; a satellite communication network and the like. In addition, communication medium that construct the communication network is not limited to any particular medium and may include a wired medium, for example, IEEE1394; USB; a power-line carrier; a cable-TV line; a telephone line; and ADSL line and the like. The communication medium may also include a wireless medium, for example, infrared such as IrDA or remote control; Bluetooth (registered trademark); 802.11 radio; HDR; a mobile telephone network; satellite line; and digital terrestrial network and the like. Moreover, the program code of the present invention may be embodied in a form of a computer data signal embedded in a carrier in which the program code is electrically delivered.

INDUSTRIAL APPLICABILITY

The energy monitoring device of the present invention detects the time-series data having predetermined period using the time-series physical quantity data related to energy consumption, as the measured data. The detected time-series data is divided by the process that associates with the added-value creation. The energy consumption of the unproductive portion from one of the divided portions can be computed as the amount of energy for improvement. Thus, the present invention can adapt to not only the electric energy consumption, but also any energy consumption such as the amount of petroleum consumption, and the like.

DESCRIPTION OF REFERENCE NUMERALS

1 Energy Monitoring Device
2 Power meter
3 Processing machine
4 PLC
5 Energy monitoring system
10 Controller
11 Memory
12 Receiver
13 Display
14 Input unit
20 Power data acquirer
21 Waste Evaluator
22 Display controller
25 Cycle Detector
26 Divider
27 Computing unit
30 Power data Storage
31 Waveform model DB storage
32 Evaluation results storage
41 Waveform acquirer
42 Pre-processor
43 Feature extractor
44 Discriminator
45 Result outputter
50 Detected data acquirer
51 Model DB creator
55 Cycle extractor
56 Waveform model creator
57 Dividing condition setter
100 Design value storage
101 Parameter storage
102 Condition storage
103 Pattern-waveform storage
110 Frequency analyzer
111 Filtering processor
112 Cycle start detector
113 Pattern-waveform creator
120 FFT unit
121 Fundamental frequency detector
122 Function determiner
123 Filtering process executor
124 Second order differential arithmetic unit
125 Threshold value determiner
126 Start-time detector
130 Pattern matcher
131 Start-time detector
132 Normal waveform extractor
133 Pattern generator
140 Outlier corrector
141 Feature value computing unit
142 Transition time determiner
$t_{an}$ Unproductive period
$t_{av}$ Added-value creating period
$D_{ct}$ Design cycle-time value
$f(t)$ Feature value

What is claimed is:

1. An energy monitoring device that computes an amount of energy to be reduced within energy consumed by equipment, the device comprising:
a power data acquirer that acquires time-series data of a physical quantity related to the consumed energy;
a memory that pre-stores waveform model information indicating a waveform model of single-cycle time-series data, wherein the single-cycle time-series data is time-series data in a single-cycle from a start to an end of a predetermined process by the equipment;
a cycle detector that detects the single-cycle time-series data within a predetermined period from the time-series data acquired by the power data acquirer, and determines whether or not the single-cycle time-series data is detected;
a divider that divides the single-cycle time-series data detected by the cycle detector into an added-value creating portion and an unproductive portion, only when the cycle detector determines that the single-cycle time-series data is detected, wherein the added-value creating portion creates an added-value in the predetermined process, and the unproductive portion does not produce any added-value in the predetermined process; and
a computer that computes an amount of energy consumed in the unproductive portion as the amount of energy to be reduced, wherein
the cycle detector extracts waveform feature data from the time-series data acquired by the power data acquirer, performs pattern matching between the waveform feature data and the waveform model information stored in the memory, and detects the single-cycle time-series data in which the waveform feature data matches the waveform model information.

2. The energy monitoring device according to claim 1, wherein the time-series data of the physical quantity includes one of electric energy and electric current.

3. The energy monitoring device according to claim 1, wherein
the memory pre-stores the waveform model information in association with a dividing condition to divide the single-cycle time-series data into the added-value creating portion and the unproductive portion by the divider, wherein
the divider divides the single-cycle time-series data into the added-value creating portion and the unproductive portion based on the dividing condition associated with the waveform model information and stored in the memory.

4. The energy monitoring device according to claim 3, further comprising:
a waveform model generator that generates the waveform model information using the time-series data of the physical quantity acquired by the power data acquirer.

5. The energy monitoring device according to claim 1, wherein
the memory pre-stores a cycle-time design value that is a design value for a period from the start to the end of the predetermined process by the equipment, and
wherein the cycle detector comprises a cycle start detector that detects a start-point of the single-cycle time-series data based on the cycle-time design value.

6. The energy monitoring device according to claim 5, wherein the memory stores waveform pattern information indicating a waveform pattern of the single-cycle time-series data, and wherein
the cycle start detector detects a start-point of the single-cycle time-series data by detecting single-cycle time-series data compatible with the waveform pattern information stored in the memory.

7. The energy monitoring device according to claim 1, wherein
the memory stores a waveform pattern information related to a waveform pattern of the single-cycle time-series data;
a waveform pattern generator that generates the waveform pattern using a plurality of single-cycle time-series data detected by the cycle detector, and stores the waveform pattern in the memory.

8. The energy monitoring device according to claim 1, wherein the divider further comprises:
a feature value computer that computes a feature value to divide the single-cycle time-series data at a point in time based on the single-cycle time-series data detected by the cycle detector; and
a transition time determiner that identifies a start-point of the unproductive portion based on the feature value computed by the feature value computer.

9. The energy monitoring device according to claim 1, wherein the computer further computes an amount of energy consumed in the added-value creating portion.

10. A method that controls an energy monitoring device to compute an amount of energy to be reduced within an energy consumed by equipment, the method comprising:
acquiring, by a processor, time-series data of a physical quantity related to the consumed energy;
pre-storing waveform model information indicating a waveform model of single-cycle time-series data, wherein the single-cycle time-series data is time-series data in a single-cycle from a start to an end of a predetermined process by the equipment;
detecting, by a processor, the single-cycle time-series data within a predetermined period from the acquired time-series data;
determining whether or not the single-cycle time-series data is detected;
dividing, by a processor, the detected single-cycle time-series data detector into an added-value creating portion and an unproductive portion, only when it is determined that the single-cycle time-series data is detected, wherein the added-value creating portion creates an added-value in the predetermined process, and the unproductive portion does not produce any added-value in the predetermined process; and
computing, by a processor, an amount of energy consumed in the unproductive portion as the amount of energy to be reduced, wherein
the detecting of the single-cycle time-series data extracts waveform feature data from the acquired time-series data, performs pattern matching between the waveform feature data and the waveform model information stored in the memory, and detects the single-cycle time-series data in which the waveform feature data matches the waveform model information.

11. A non-transitory computer readable storage medium having computer instructions stored thereon comprising an energy monitoring program that operates an energy monitoring device to compute an amount of energy to be reduced within an energy consumed by equipment, the program causing a computer to perform:
acquiring time-series data of a physical quantity related to the consumed energy;
re-storing waveform model information indicating a waveform model of single-cycle time-series data, wherein the single-cycle time-series data is time-series data in a single-cycle from a start to an end of a predetermined process by the equipment;
detecting the single-cycle time-series data within a predetermined period from the acquired time-series data;
dividing the detected single-cycle time-series data into an added-value creating portion and an unproductive portion, only when it is determined that the single-cycle time-series data is detected, wherein the added-value creating portion creates an added-value in the predetermined process, and the unproductive portion does not produce any added-value in the predetermined process; and
computing an amount of energy consumed in the unproductive portion as the amount of energy to be reduced, wherein
the detecting of the single-cycle time-series data extracts waveform feature data from the acquired time-series data, performs pattern matching between the waveform feature data and the waveform model information stored in the memory, and detects the single-cycle time-series data in which the waveform feature data matches the waveform model information.

12. The energy monitoring device according to claim 3, wherein the memory pre-stores a cycle-time design value that is a design value for a period from the start to the end of the predetermined process by the equipment, and wherein the cycle detector comprises a cycle start detector that detects a start-point of the single-cycle time-series data based on the cycle-time design value.

13. The energy monitoring device according to claim 4, wherein the memory pre-stores a cycle-time design value that is a design value for a period from the start to the end of the predetermined process by the equipment, and wherein the cycle detector comprises a cycle start detector that detects a start-point of the single-cycle time-series data based on the cycle-time design value.

14. The energy monitoring device according to claim 12, wherein the memory stores waveform pattern information indicating a waveform pattern of the single-cycle time-series data, and wherein the cycle start detector detects a start-point of the single-cycle time-series data by detecting single-cycle time-series data compatible with waveform pattern information stored in the memory.

15. The energy monitoring device according to claim 13, wherein the memory stores waveform pattern information indicating a waveform pattern of the single-cycle time-series data, and wherein the cycle start detector detects a start-point of the single-cycle time-series data by detecting single-cycle time-series data compatible with waveform pattern information stored in the memory.

16. The energy monitoring device according to claim 3, wherein the memory stores a waveform pattern information related to a waveform pattern of the single-cycle time-series data, and wherein a waveform pattern generator generates the waveform pattern using a plurality of single-cycle time-series data detected by the cycle detector, and stores the waveform pattern in the memory.

17. The energy monitoring device according to claim 4, wherein the memory stores a waveform pattern information related to a waveform pattern of the single-cycle time-series data, and wherein a waveform pattern generator generates the waveform pattern using a plurality of single-cycle time-series data detected by the cycle detector, and stores the waveform pattern in the memory.

18. The energy monitoring device according to claim 5, wherein the memory stores a waveform pattern information related to a waveform pattern of the single-cycle time-series data, and wherein a waveform pattern generator generates the waveform pattern using a plurality of single-cycle time-series data detected by the cycle detector, and stores the waveform pattern in the memory.

19. The energy monitoring device according to claim 5, wherein the cycle detector further comprises:

a frequency analyzer that analyzes the time-series data of the physical quantity detected by the power data acquirer to obtain a fundamental frequency using the cycle-time design value; and a filter that determines a filter function based on the fundamental frequency, and applies the filter function to the time-series data of the physical quantity to obtain filtered time-series data;

wherein the cycle start detector calculates a second-order differential of the filtered time-series data, determines a power data threshold value and a second order differential threshold value using the second-order differential, and detects the start-point of the single-cycle time-series data based on the power data threshold value, the second order differential threshold value, the filtered time-series data and the second-order differential.

20. The energy monitoring device according to claim 6, wherein the cycle detector further comprises:

a frequency analyzer that analyzes the time-series data of the physical quantity detected by the power data acquirer to obtain a fundamental frequency using the cycle-time design value; and a filter that determines a filter function based on the fundamental frequency, applies the filter function to the time-series data of the physical quantity to obtain filtered time-series data, and applies the filter function to the waveform pattern to obtain filtered waveform pattern, wherein the cycle start detector performs pattern matching between the filtered time-series data and filtered waveform pattern, and detects a start-point of a portion of the filtered time-series data that most closely matches the filtered waveform pattern, as the start-point of the single-cycle time-series data.

21. The energy monitoring device according to claim 1, wherein the single-cycle time-series data is time-series data from a start of processing a single workpiece to an end of the processing of the single workpiece by the equipment.

* * * * *